US009147134B2

(12) United States Patent
 Shimada

(10) Patent No.: US 9,147,134 B2
(45) Date of Patent: Sep. 29, 2015

(54) CONNECTOR DEVICE AND ELECTRONIC APPARATUS INCLUDING THEREOF

(71) Applicant: Japan Aviation Electronics Industry Limited, Tokyo (JP)

(72) Inventor: Masaaki Shimada, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 38 days.

(21) Appl. No.: 14/258,227

(22) Filed: Apr. 22, 2014

(65) Prior Publication Data

US 2014/0363995 A1   Dec. 11, 2014

(30) Foreign Application Priority Data

Jun. 5, 2013 (JP) .................................. 2013-119232

(51) Int. Cl.
 *H01R 13/62* (2006.01)
 *G06K 13/08* (2006.01)
(52) U.S. Cl.
 CPC .................................. *G06K 13/085* (2013.01)
(58) Field of Classification Search
 CPC .......... H01R 13/62; H01R 12/73; H05K 7/02; H05K 5/00; G06K 13/085
 USPC .................................... 439/159; 361/754, 798
 See application file for complete search history.

(56) References Cited

U.S. PATENT DOCUMENTS

| 5,655,917 | A | 8/1997 | Kaneshige et al. | |
|---|---|---|---|---|
| 6,962,500 | B1* | 11/2005 | Chen | 439/159 |
| 7,033,190 | B1* | 4/2006 | Chen | 439/159 |
| 8,371,866 | B1* | 2/2013 | Su et al. | 439/159 |
| 8,419,454 | B1* | 4/2013 | Ji et al. | 439/159 |
| 8,740,635 | B2* | 6/2014 | Lim et al. | 439/159 |
| 8,971,035 | B2* | 3/2015 | Tamaki | 361/679.33 |
| 2008/0064239 | A1* | 3/2008 | Li | 439/152 |
| 2012/0276780 | A1* | 11/2012 | Hu et al. | 439/630 |
| 2013/0033845 | A1* | 2/2013 | Duan et al. | 361/807 |
| 2013/0050964 | A1* | 2/2013 | Kume | 361/754 |
| 2013/0130527 | A1* | 5/2013 | Lee et al. | 439/159 |

(Continued)

FOREIGN PATENT DOCUMENTS

| JP | 3213872 B2 | 10/2001 |
|---|---|---|
| JP | 2008-108695 A | 5/2008 |
| JP | 2014-002893 A | 1/2014 |

OTHER PUBLICATIONS

Japanese Office Action dated Jul. 3, 2014 in Japanese Patent Application No. 2013-119232, with English translation of same.

*Primary Examiner* — Abdullah Riyami
*Assistant Examiner* — Nader J Alhawamdeh
(74) *Attorney, Agent, or Firm* — Collard & Roe, P.C.

(57) ABSTRACT

A connector device comprises a tray, a connector body, a lock member and a pressing member. The lock member is unmovable beyond a second position along an ejection direction. The pressing member applies a force toward the second position directly or indirectly to the lock member. The tray is formed with a locked portion. The lock member is provided with a lock portion and a pressed portion. The lock portion locks the locked portion to prevent the tray from moving beyond a lock position along the ejection direction when the tray is accommodated in the connector body. The pressing member presses the pressed portion against the case when the connector device is attached in the case. The tray located at the locked position is positioned relatively to the case by this pressing.

12 Claims, 22 Drawing Sheets

(56) References Cited

U.S. PATENT DOCUMENTS

| | | | |
|---|---|---|---|
| 2013/0309885 A1* | 11/2013 | Liu et al. | 439/153 |
| 2014/0273564 A1* | 9/2014 | Matsumoto et al. | 439/153 |
| 2015/0011118 A1* | 1/2015 | Matsunaga | 439/527 |

\* cited by examiner

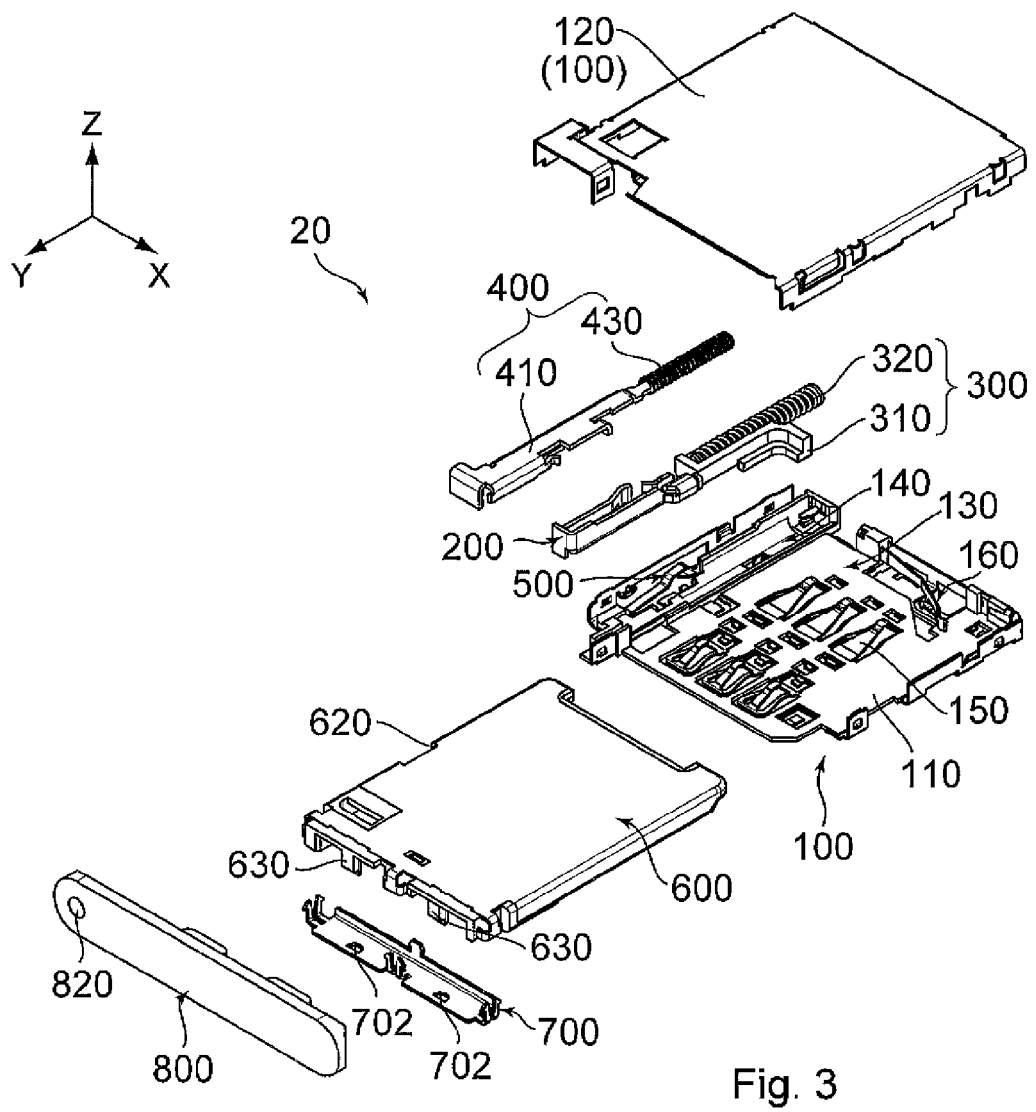
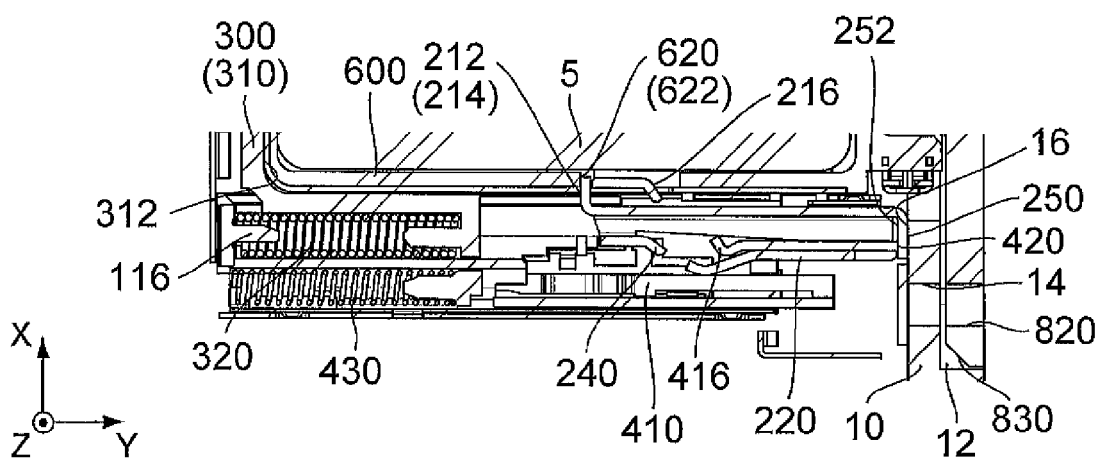
Fig. 3
Fig. 4

CONNECTOR DEVICE AND ELECTRONIC APPARATUS INCLUDING THEREOF

CROSS REFERENCE TO RELATED APPLICATIONS

An applicant claims priority under 35 U.S.C. §119 of Japanese Patent Application No. JP2013-119232 filed Jun. 5, 2013.

BACKGROUND OF THE INVENTION

This invention relates to a connector device connectable with a card mounted on a tray, and an electronic apparatus comprising this connector device.

For example, this type of connector device is disclosed in each of JP-B 3213872 (Patent Document 1) and JP-A 2008-108695 (Patent Document 2), the contents of which are incorporated herein by reference.

As shown in FIG. 42, the connector device of Patent Document 1 comprises a tray and a connector body having an electrical connection function. When the tray is accommodated in the connector body, a part of the tray and a part of the connector body are engaged with each other to maintain the accommodated state.

As shown in FIG. 43, the connector device of Patent Document 2 comprises a tray having a locked portion, a connector body having an electrical connection function, and a lock portion. When the tray is accommodated in the connector body, the locked portion and the lock portion are engaged with each other to maintain the accommodated state.

In each of the connector devices of Patent Document 1 and Patent Document 2, the position of the tray depends on the position of the connector body. Accordingly, when the connector device is attached in a case of an electronic apparatus, the relative position of the tray to the case depends on the relative position of the connector body to the case. However, it is difficult to control the relative position of the connector body to the case because of fabrication tolerances and erection tolerances of various members. Accordingly, the relative position of the tray to the case cannot be easily controlled. For example, when the tray is accommodated in the connector body, a part of the tray might protrude outward from the case.

SUMMARY OF THE INVENTION

It is therefore an object of the present invention to provide a connector device having a structure which is easily controllable a relative position between a case and a tray when the connector device is attached in the case of an electronic apparatus.

One aspect (first aspect) of the present invention provides a connector device which is attached in a case of an electronic apparatus when the connector device is used. The connector device comprises a tray, a connector body, a lock member, an unlock structure and a pressing member. The tray is formed with a locked portion. The connector body has an electrical connection function. The connector body is accommodatable the tray which is inserted, at least in part, into the connector body along an insertion direction. The lock member is held by the connector body. The lock member is movable between a first position and a second position along the insertion direction. The lock member is unmovable beyond the first position along the insertion direction and unmovable beyond the second position along an ejection direction opposite to the insertion direction. The lock member is provided with a lock portion and a pressed portion. The lock portion is movable in a lateral direction perpendicular to the insertion direction. The lock portion locks the locked portion to prevent the tray from moving beyond a lock position along the ejection direction when the tray is accommodated in the connector body. The unlock structure moves the lock portion in the lateral direction to unlock the locked portion from the lock portion when operated. The pressing member applies a force toward the second position directly or indirectly to the lock member. The pressing member presses the pressed portion against the case when the connector device is attached in the case. A press of the pressed portion against the case positions the tray, which is located at the locked position, relatively to the case.

Another aspect (second aspect) of the present invention provides an electronic apparatus comprising the connector device of the first aspect, a case and a door member. The connector body is fixed in the case. The door member is attached to the tray in a state where a positional relation to the tray in the insertion direction is fixed. The pressed portion is pressed against an inside portion of the case. When the tray is located at the lock position, the door member is positioned relatively to the case by a press of the pressed portion against the case.

According to the present invention, the pressed portion of the lock member is pressed against the case when the connector device is attached in the case of the electronic apparatus. The relative positional relation between the lock member and the case can be adjusted by this configuration. Accordingly, the relative positional relation between the tray located at the lock position and the case can be adjusted.

The present invention is applicable, for example, to a connector device for an IC card such as a Subscriber Identity Module (SIM) card which is to be installed in an electronic device such as a portable telephone.

An appreciation of the objectives of the present invention and a more complete understanding of its structure may be had by studying the following description of the preferred embodiment and by referring to the accompanying drawings.

BRIEF DESCRIPTION OF THE DRAWINGS

FIG. 3 is an exploded, perspective view showing the connector device of FIG. 1.

FIG. 4 is an enlarged, cross-sectional view showing a part of the connector device of FIG. 1.

Figure 1:
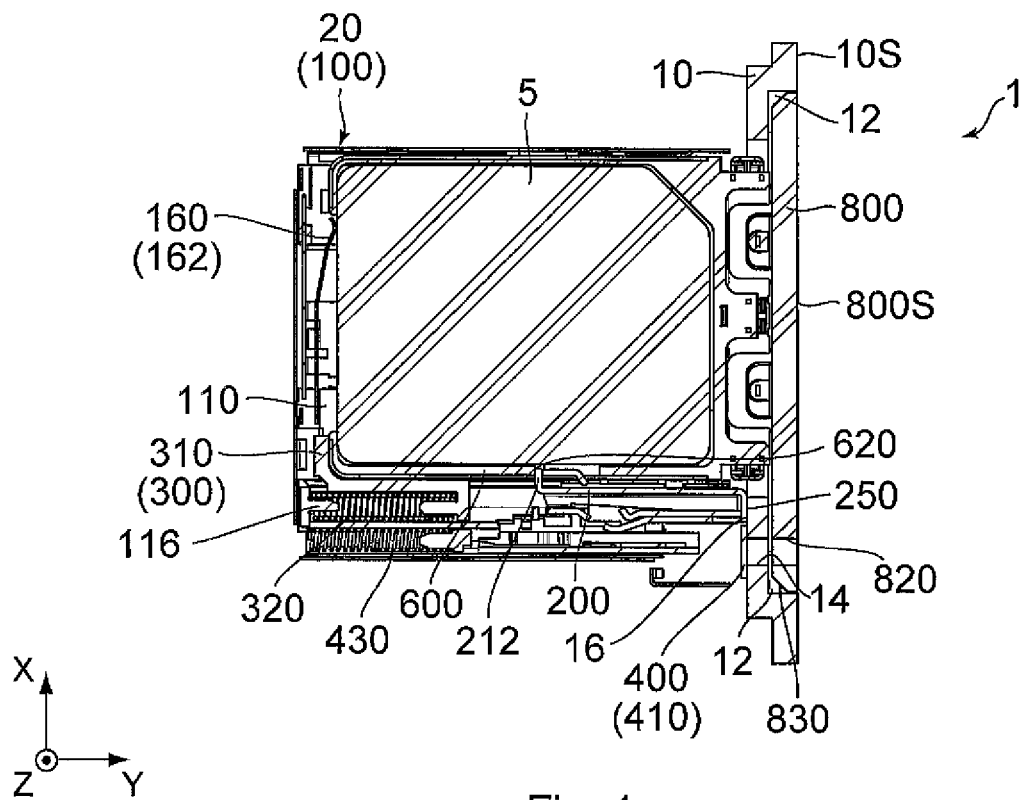
FIG. 1 is a cross-sectional view showing a connector device according to an embodiment of the present invention, wherein a lock portion of a lock member of the connector device is located in a locked portion of a tray.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

As can be seen from FIGS. 1, 2, 5, 6, 11 and 12, a connector device 20 according to an embodiment of the present invention is mounted on and fixed to a circuit board 7 to be attached in a case 10 of an electronic apparatus 1 when the connector device 20 is used. The circuit board 7 is fixed to the case 10. Accordingly, a position of the connector device 20 in the case 10 is also fixed. However, a positional relation between the connector device 20 and the case 10 is varied within a range of fabrication tolerances and erection tolerances of various members.

Figure 26:
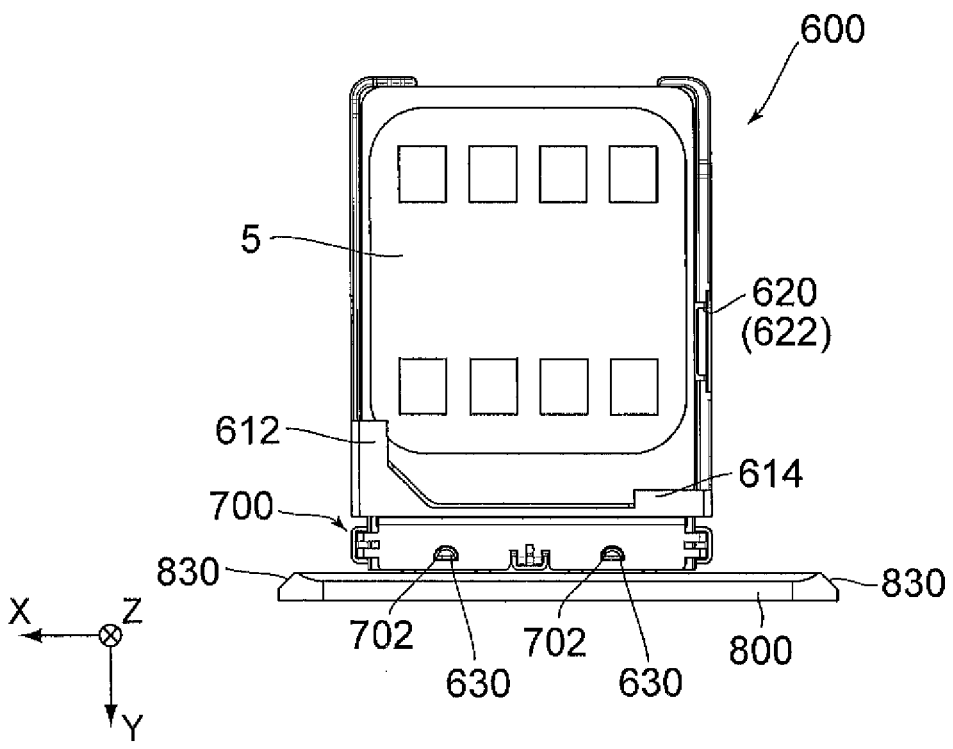
FIG. 26 is a top view showing the tray and the door member of FIG. 24, wherein a card is accommodated in the tray.
Figure 27:
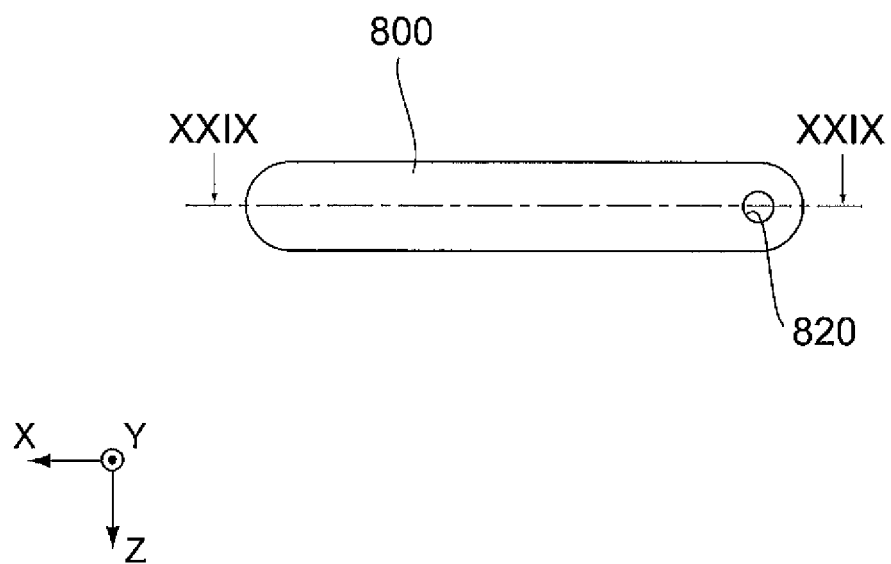
FIG. 27 is a front view showing the door member of FIG. 24, wherein the tray is hidden behind the door member.
Figure 28:
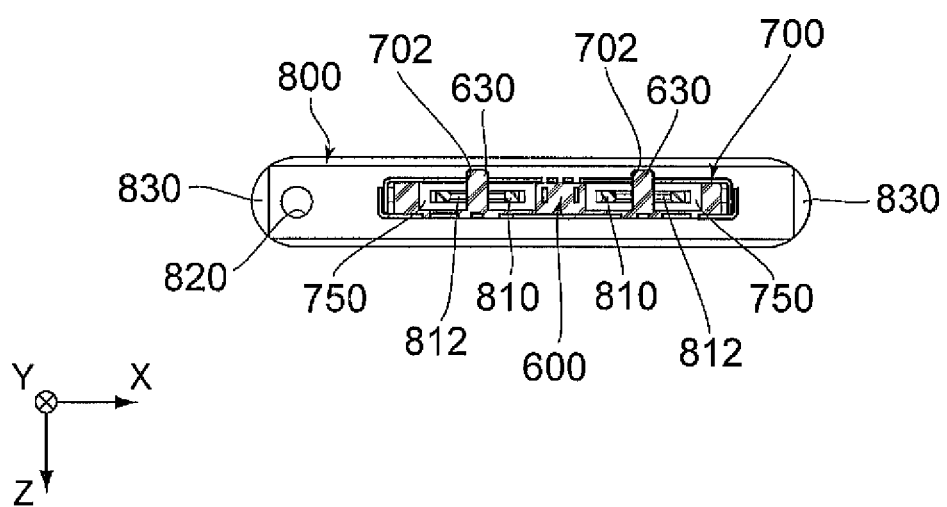
FIG. 28 is a cross-sectional view showing the tray and the door member of FIG. 24, taken along line XXVIII-XXVIII.

Referring to FIG. 3, the connector device 20 according to the present embodiment comprises a connector body 100, a lock member 200, an eject structure (pressing member) 300, an unlock structure 400 and a tray 600. The connector body 100 has an electrical connection function. The tray 600 is a member for accommodating a card 5 (see FIG. 26) therewithin. The tray 600 is attached with a door member 800 by using a cap 700.

Figure 2:
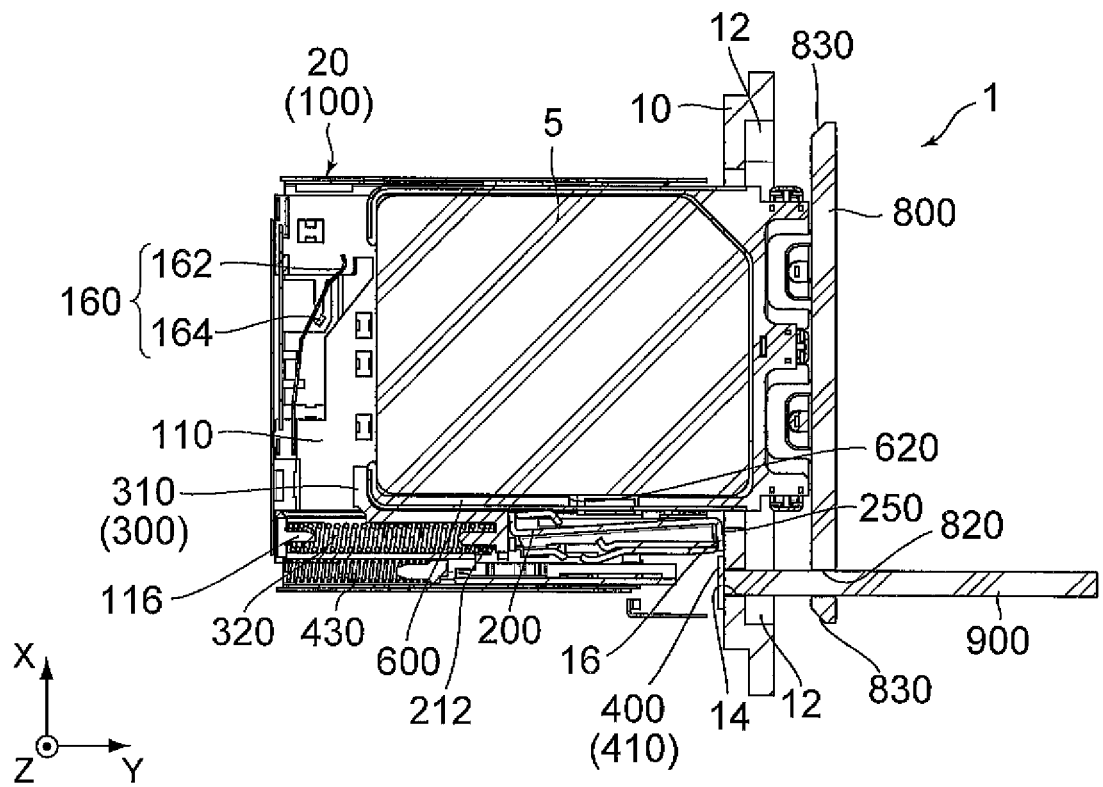
FIG. 2 is another cross-sectional view showing the connector device of FIG. 1, wherein the lock portion of the lock member is located out of the locked portion of the tray.
Figure 5:
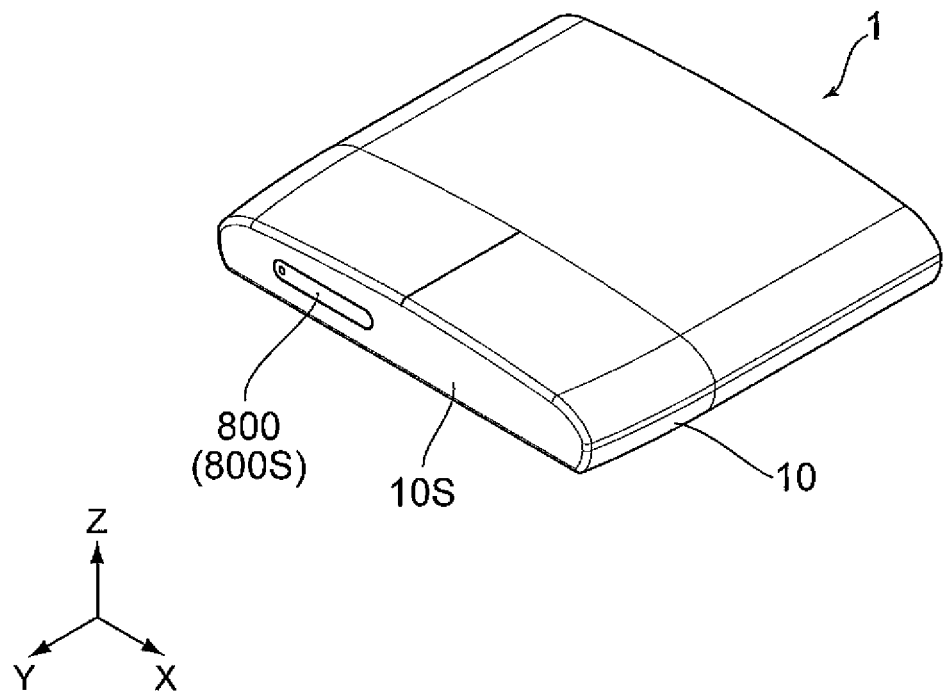
FIG. 5 is a perspective view showing an electronic apparatus in which the connector device of FIG. 1 is installed, wherein the tray is accommodated in a case of the electronic apparatus.
Figure 6:
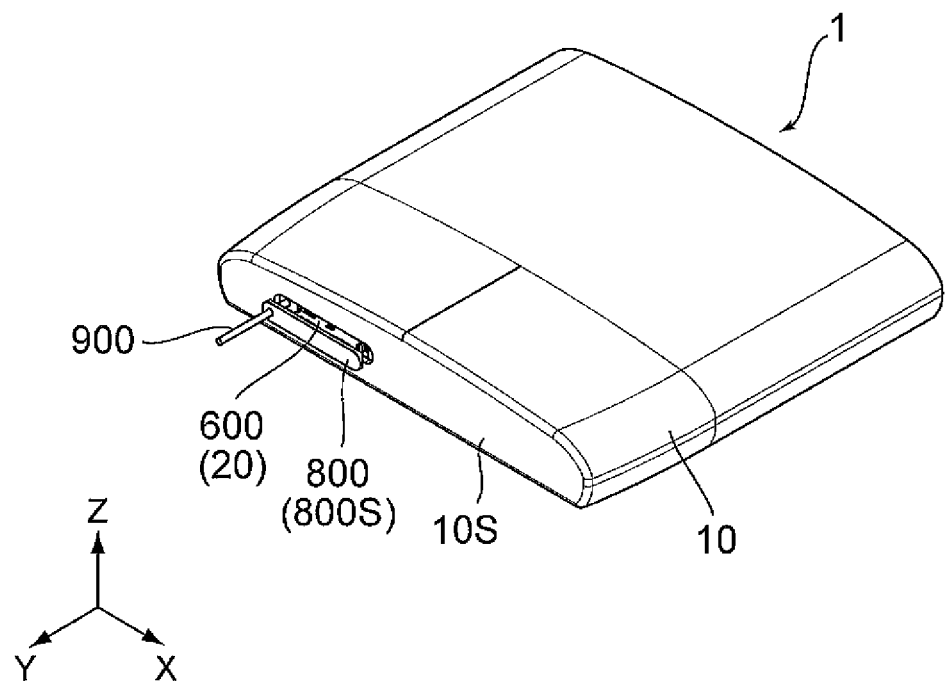
FIG. 6 is another perspective view showing the electronic apparatus of FIG. 5, wherein the tray is partially ejected by using an operation member.

As shown in FIGS. 1 and 2, the tray 600 is insertable, at least in part, into the connector body 100 along an insertion direction (negative Y-direction). The connector body 100 is accommodatable the tray 600 which is thus inserted. The tray 600 has at least a locked portion 620. The structure of the tray 600 is described later in detail.

As shown in FIG. 1, the lock member 200 is a member for locking an accommodated state where the tray 600 is accommodated in the connector body 100. In detail, the lock member 200 has at least a lock portion 212 which is movable in a lateral direction (X-direction) perpendicular to the insertion direction. The lock portion 212 locks the locked portion 620 to prevent the tray 600 from moving beyond a lock position along an ejection direction (positive Y-direction) opposite to the insertion direction when the tray 600 is accommodated in the connector body 100. Accordingly, the accommodated state is maintained. The eject structure 300 pushes the tray 600 accommodated in the connector body 100 along the ejection direction (positive Y-direction). When operated, the unlock structure 400 moves the lock portion 212 of the lock member 200 in the lateral direction to unlock the locked portion 620 from the lock portion 212.

As shown in FIG. 1, an outer surface 800S of the door member 800 is exposed to the outside of the electronic apparatus 1 under a state where the connector device 20 is installed in the case 10 of the electronic apparatus 1 and where the tray 600 is accommodated in the connector body 100. The outer surface 800S of the door member 800 according to the present embodiment forms a common plane together with an outer surface 10S of the case 10 under the aforementioned state.

Referring to FIGS. 1, 2, 22 and 23, some parts of the case 10 are especially related to the connector device 20. In detail, the case 10 is formed with a door accommodation portion 12. The door accommodation portion 12 accommodates the door member 800 when the tray 600 is accommodated in the connector body 100. In addition, the case 10 is provided with a hole 14. The door accommodation portion 12 communicates with the inside of the case 10 via the hole 14. As described later, a part located inside of the door accommodation portion 12 functions as a reference portion 16 which is a reference for the positioning of the tray 600 and the door member 800 to the case 10. More specifically, the reference portion 16 according to the present embodiment is an inner wall surface of the door accommodation portion 12.

Referring to FIG. 3, the connector body 100 includes a housing 110, a cover 120 made of a metal and a plurality of contacts 150 each made of a conductor. The housing 110 according to the present embodiment is formed by embedding a strengthening member made of a metal into a thin insulator in order to reduce its size and to have strength. However, the present invention is not limited thereto. The housing 110 may be formed only of an insulator. The cover 120 is combined with the housing 110 to form a primary accommodation portion 130 and a secondary accommodation portion 140. The primary accommodation portion 130 is a space for accommodating the tray 600, while the secondary accommodation portion 140 is a space for accommodating the Lock member 200, the eject structure 300 and the unlock structure 400. In the present embodiment, the primary accommodation portion 130 and the secondary accommodation portion 140 are arranged in a row in the lateral direction (X-direction) perpendicular to the insertion direction. The contacts 150 are held by the housing 110 to be located within the primary accommodation portion 130.

Figure 7:
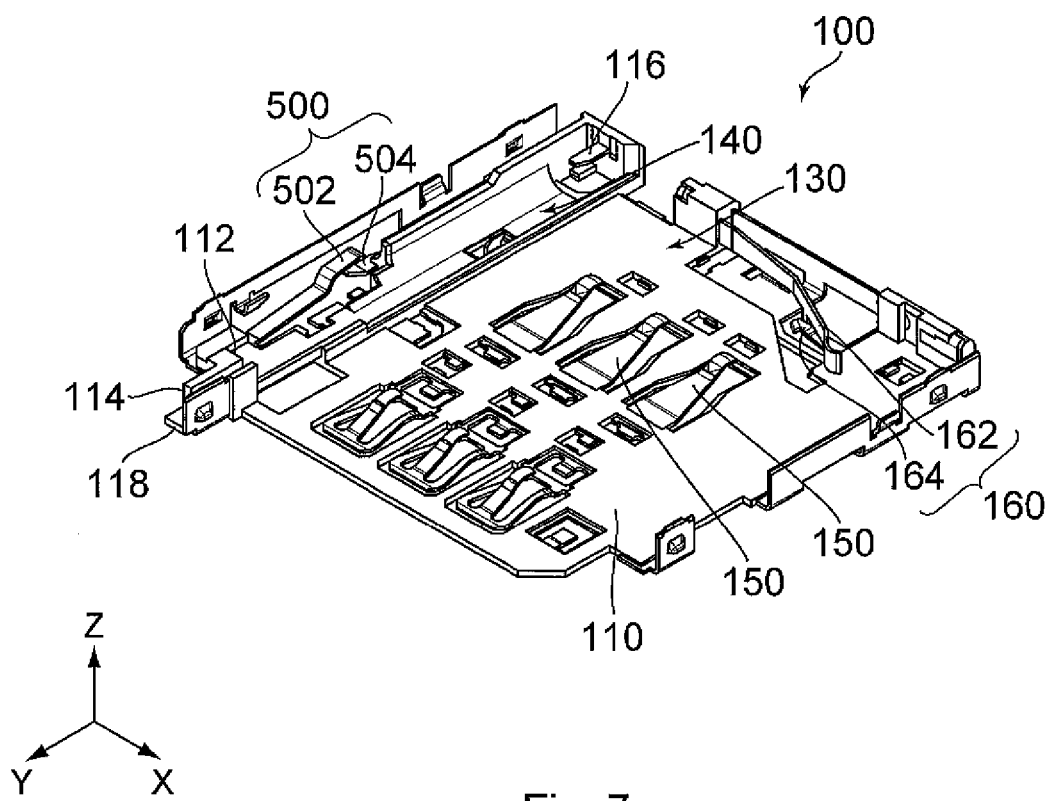
FIG. 7 is a perspective view showing a connector body of the connector device of FIG. 3, wherein a cover of the connector device is not illustrated.

As shown in FIGS. 3 and 7, the housing 110 is incorporated with a detection switch 160 and a pre-warning switch 500. In other words, the connector device 20 comprises the detection switch 160 and the pre-warning switch 500.

As shown in FIG. 7, the detection switch 160 is located within the primary accommodation portion 130. The detection switch 160 has a switch piece 162 and a switch piece 164. Because the detection switch 160 according to the present embodiment is a normal close switch, the switch piece 162 and the switch piece 164 are in contact with each other under an initial state of the detection switch 160. As can be seen from FIGS. 1 and 2, when the tray 600 is accommodated in the connector body 100, the switch piece 162 is pushed by the tray 600 or the card 5 to be separated from the switch piece 164. Accordingly, the insertion of the tray 600 or the card 5 can be detected.

As shown in FIG. 7, the pre-warning switch 500 is located within the secondary accommodation portion 140. The pre-warning switch 500 has a switch piece 502 and a switch piece 504. Because the pre-warning switch 600 according to the present embodiment is a normal open switch, the switch piece 502 and the switch piece 504 are arranged not to be in contact with each other under an initial state of the pre-warning switch 500. As described later with reference to FIGS. 22 and 23, the pre-warning switch 500 is a switch for detecting that the unlock structure 400 is operated and for figuring out, in advance to the ejection of the tray 600, that the tray 600 is to be ejected.

As shown in FIG. 7, the housing 110 has a position-regulation portion 112, a spring receiver 116, a position-regulation portion 114 and a position-regulation portion 118 which are provided in a space corresponding to the secondary accommodation portion 140. The position-regulation portions 112, 114 and 118 are portions for regulating a position of the lock member 200. The position-regulation portion 112 faces the insertion direction (negative Y-direction), while the position-regulation portions 114 and 118 face the ejection direction (positive Y-direction). The spring receiver 116 is a portion for partially positioning the eject structure 300.

Figure 8:
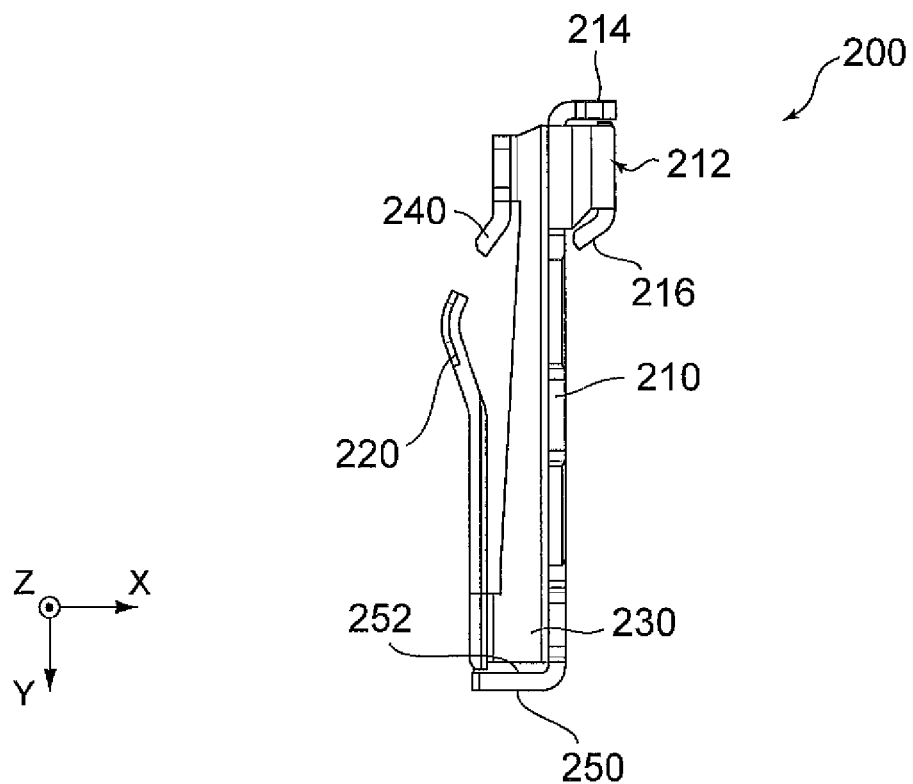
FIG. 8 is a top view showing the lock member of the connector device of FIG. 3.
Figure 9:
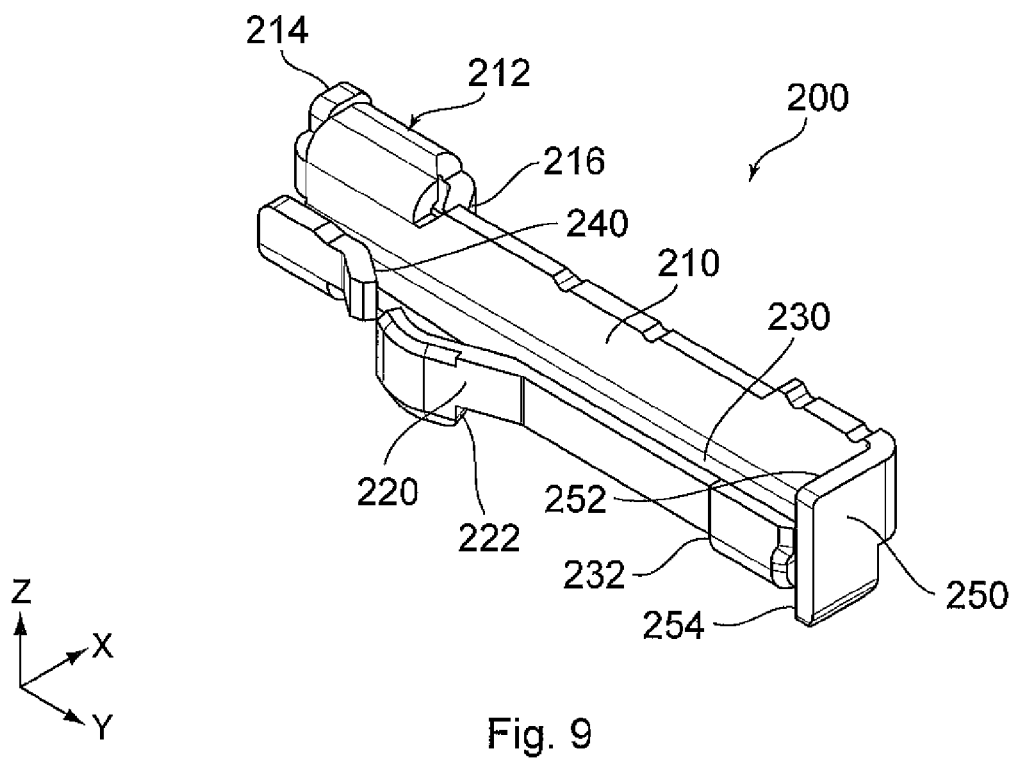
FIG. 9 is a perspective view showing the lock member of FIG. 8.
Figure 10:
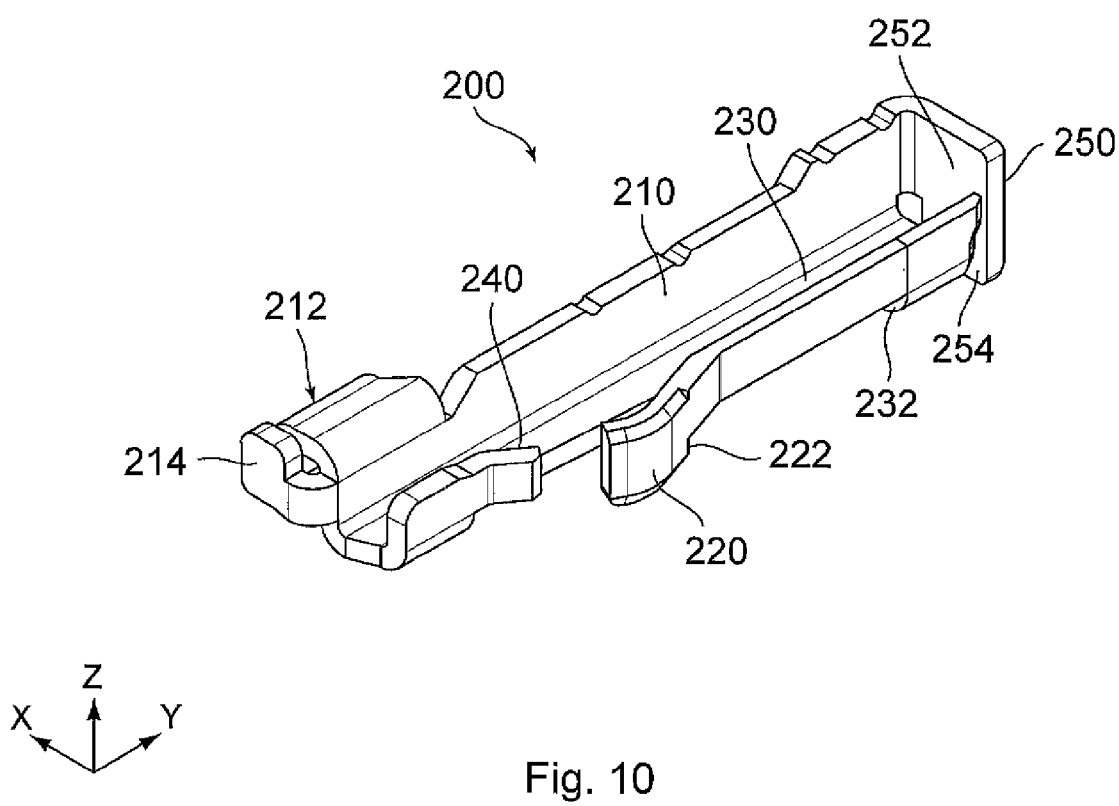
FIG. 10 is another perspective view showing the lock member of FIG. 8.
Figure 11:
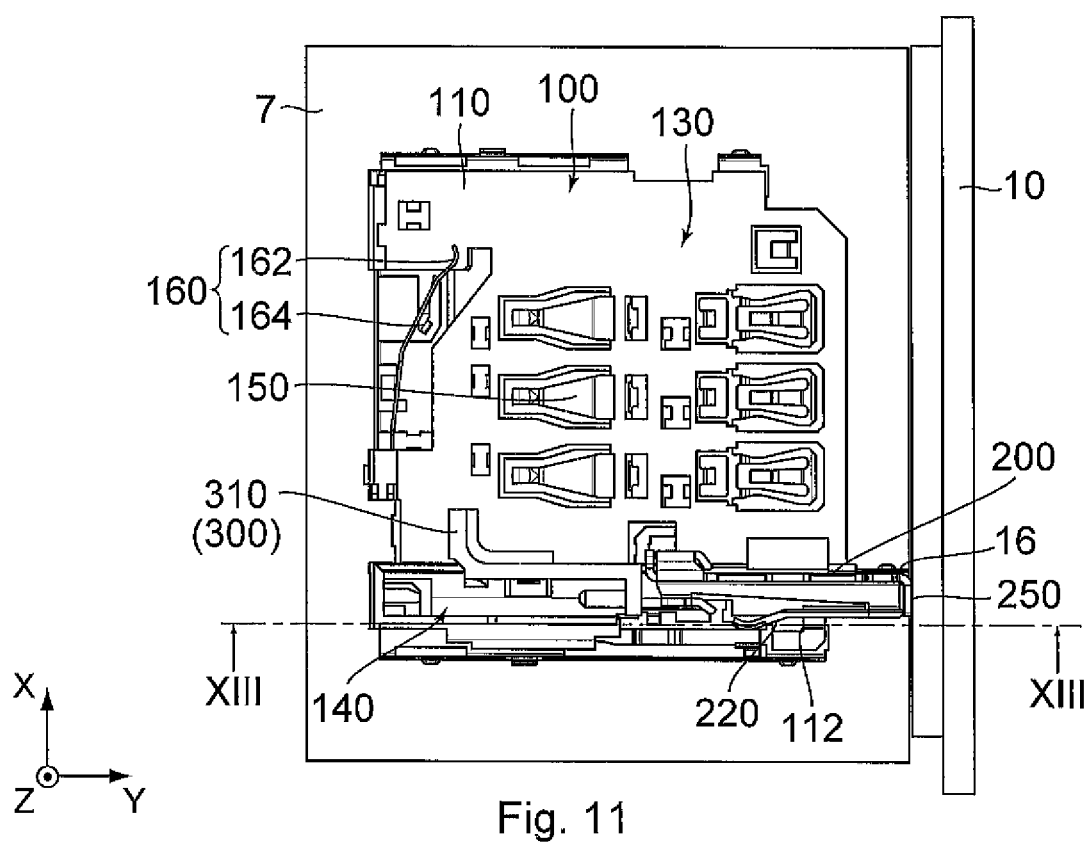
FIG. 11 is a top view showing a relation among the connector body, the lock member and the case.
Figure 12:
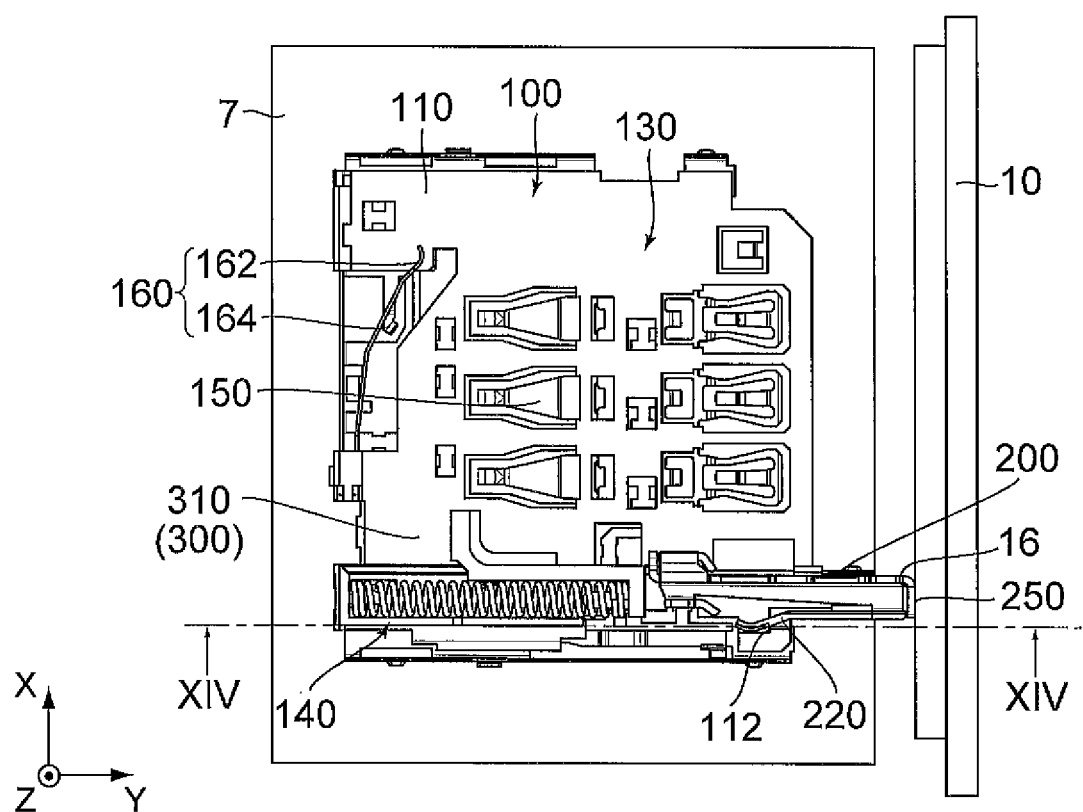
FIG. 12 is another top view showing a relation among the connector body, the lock member and the case.
Figure 13:
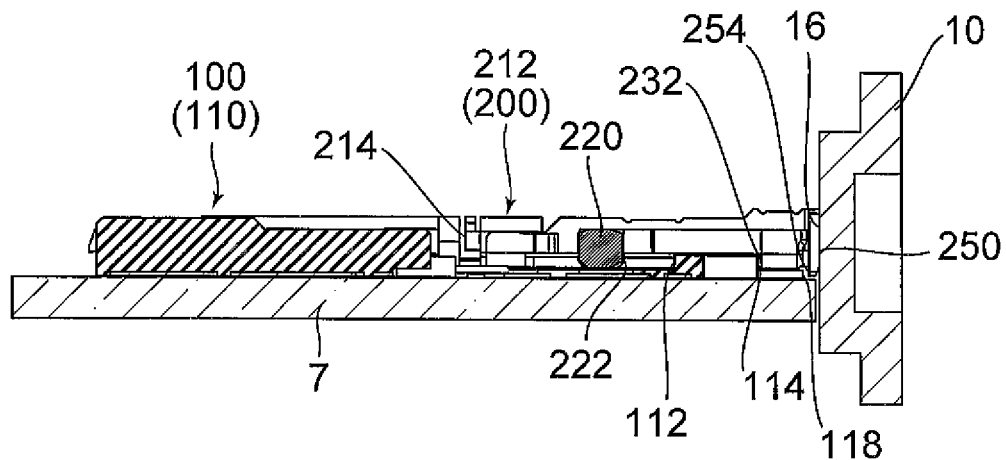
FIG. 13 is a cross-sectional view showing the relation of FIG. 11, taken along line XIII-XIII.
Figure 14:
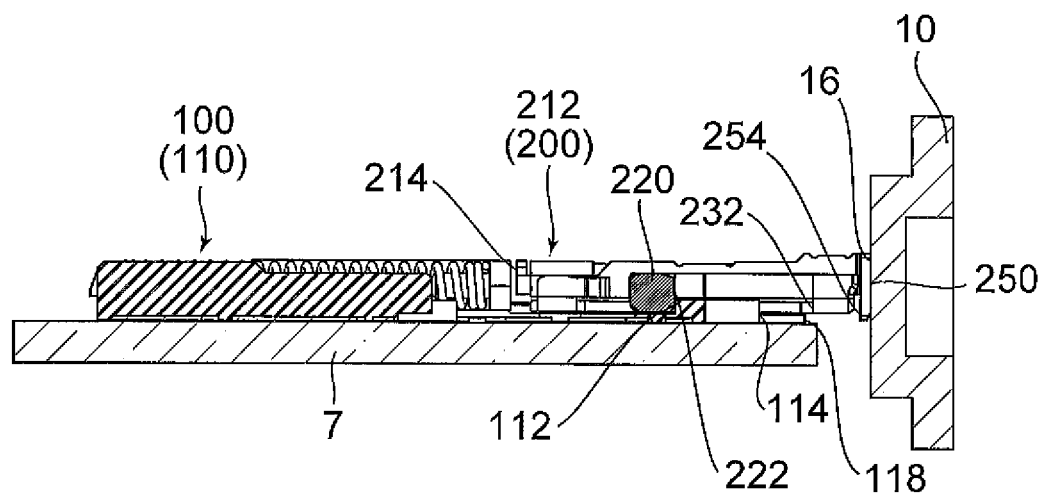
FIG. 14 is a cross-sectional view showing the relation of FIG. 12, taken along line XIV-XIV.

As shown in FIGS. 8 to 10, the lock member 200 is formed by punching out and bending a single metal plate. The lock member 200 has an arm 210, a spring portion 220, a coupling portion 230, a second conversion portion 240 and a pressed portion 250.

The arm 210 is formed to have relatively high hardness and to be resiliently undeformable. The aforementioned lock portion 212 is formed at an end of the arm 210 in the insertion direction to be supported by the arm 210. The lock portion 212 is provided with a first abutment portion 214 located at a rear end (negative Y-side end) thereof in a front-rear direction (Y-direction). The first abutment portion 214 has a surface perpendicular to the insertion direction. The first abutment portion 214 according to the present embodiment faces the insertion direction (negative Y-direction). The lock portion 212 is provided with a tray guide portion 216 located at a front end (positive Y-side end) thereof. The tray guide portion 216 has a surface oblique to the insertion direction.

As can be seen from FIGS. 1 and 8 to 10, the arm 210 extends along the insertion direction (negative Y-direction) under a state where the lock portion 212 locks the locked portion 620 of the tray 600.

The spring portion 220 faces the arm 210 in the lateral direction (X-direction). The spring portion 220 is formed so that the spring portion 220 is easy to be resiliently deformable in comparison with the arm 210. The spring portion 220 is formed with a position-regulation portion 222 located at a lower side (negative Z-side) of a rear end portion (negative Y-side end portion) thereof. The position-regulation portion 222 faces the ejection direction (positive Y-direction).

The coupling portion 230 couples the arm 210 and the spring portion 220 with each other. The spring portion 220 according to the present embodiment extends from a part (start portion) of the coupling portion 230. The coupling portion 230 is formed with a position-regulation portion 232 located in the vicinity of the start portion thereof. The position-regulation portion 232 faces the insertion direction (negative Y-direction).

The second conversion portion 240 is provided in the vicinity of an end of the coupling portion 230 in the insertion direction. In the present embodiment, the second conversion portion 240 and the lock portion 212 are provided to be located near to each other in the insertion direction. Accordingly, when the second conversion portion 240 is moved in the lateral direction (X-direction), the lock portion 212 is also moved in the lateral direction by a distance almost same as the movement distance of the second conversion portion 240. The second conversion portion 240 has a surface oblique to both the insertion direction and the lateral direction. In detail, the second conversion portion 240 has the surface that faces the positive X-direction and the positive Y-direction.

The pressed portion 250 has a plate-like shape perpendicular to the ejection direction (positive Y-direction). As shown in FIGS. 8 to 10, the pressed portion 250 according to the present embodiment extends in the lateral direction, specifically, in the negative X-direction, from a front end (positive Y-side end) of the arm 210. The pressed portion 250 has a rear surface (negative Y-side surface) which functions as a second pushed portion 252. The second pushed portion 252 has a lower part which functions as a position-regulation portion 254. The position-regulation portion 254 faces the insertion direction (negative Y-direction).

As shown in FIGS. 11 to 14, the lock member 200 is held by the housing 110 of the connector body 100 to be movable along the insertion direction (negative Y-direction) and the ejection direction (positive Y-direction). In the present embodiment, the rearmost position of the lock member 200 along the insertion direction is referred to as a first position, while the foremost position of the lock member 200 along the insertion direction is referred to as a second position. In other words, the first position is a position of the lock member 200 which is maximally moved along the insertion direction, while the second position is another position of the lock member 200 which is maximally moved along the ejection direction. Thus, the lock member 200 according to the present embodiment is movable between the first position and the second position along the insertion direction and the ejection direction. The lock member 200 is unmovable beyond the first position along the insertion direction and unmovable beyond the second position along the ejection direction. As can be seen from FIGS. 11 and 13, the first position according to the present embodiment is a position where the position-regulation portion 232 and the position-regulation portion 254 of the lock member 200 are brought into abutment with the position-regulation portion 114 and the position-regulation portion 118 of the housing 110, respectively. As can be seen from FIGS. 12 and 14, the second position according to the present embodiment is another position where the position-regulation portion 222 of the lock member 200 is brought into abutment with the position-regulation portion 112 of the housing 110.

As shown in FIG. 3, the eject structure 300 includes an eject bar 310 made of an insulator and a resilient member 320. The resilient member 320 according to the present embodiment is a spring. The unlock structure 400 includes a release member 410 made of a metal and a resilient member 430. The resilient member 430 according to the present embodiment is a spring.

Figure 15:
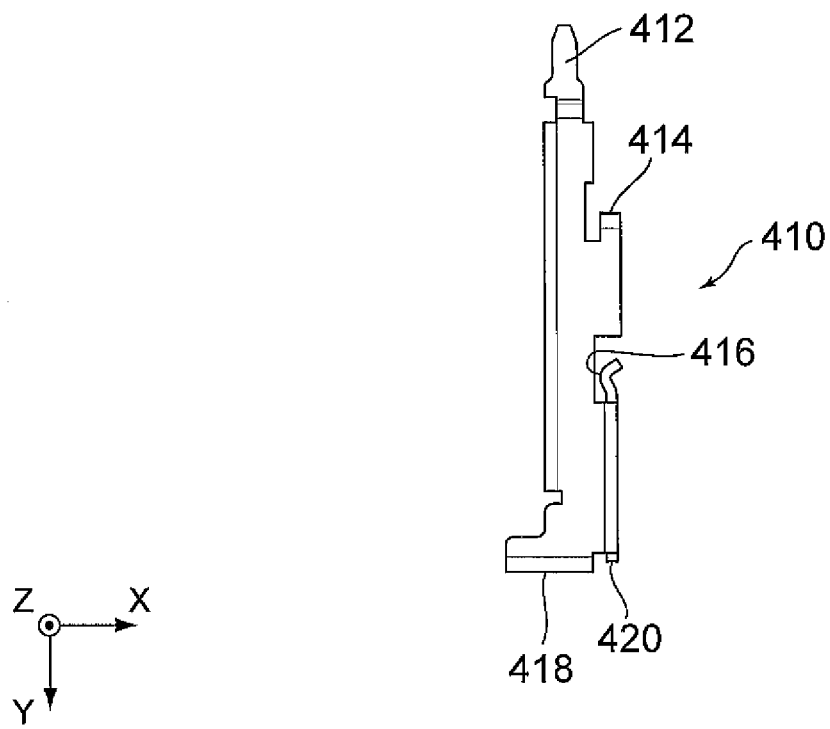
FIG. 15 is a top view showing a release member of the connector device of FIG. 3.
Figure 16:
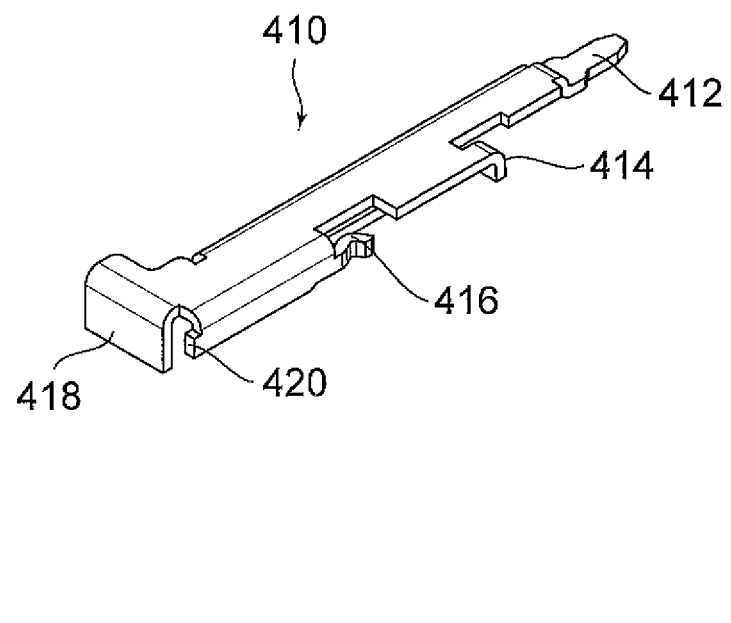
FIG. 16 is a perspective view showing the release member of FIG. 15.
Figure 17:
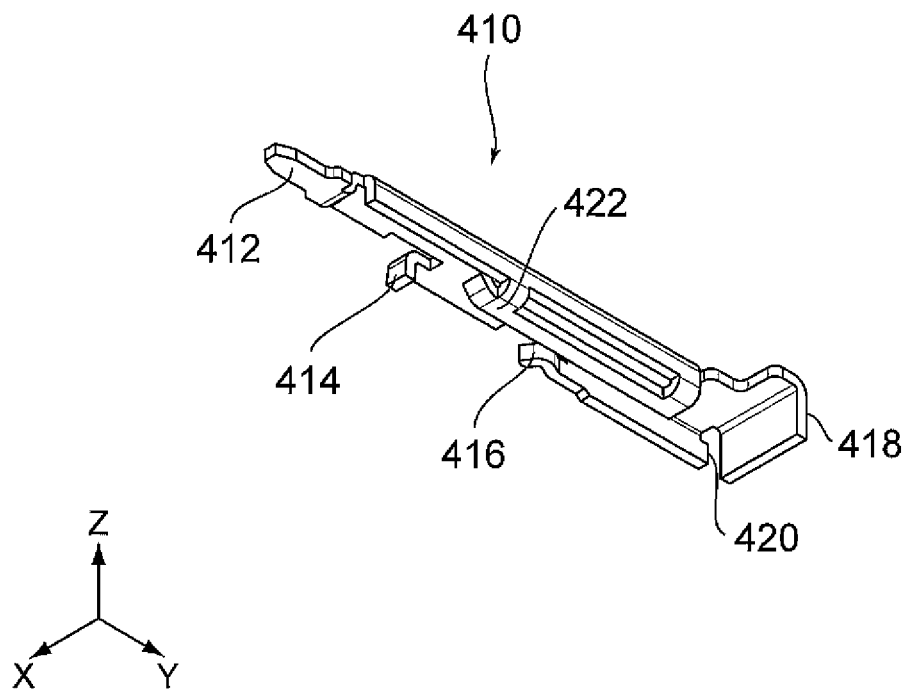
FIG. 17 is another perspective view showing the release member of FIG. 15.

As shown in FIGS. 15 to 17, the release member 410 is formed by punching out and bending a single metal plate. The release member 410 has a spring receiver 412, a first pushed portion 414, a first conversion portion 416, an operated portion 418, a second pushing portion 420 and a switch operator 422. The spring receiver 412 is inserted in an end of the resilient member 430 to receive a force from the resilient member 430. The first pushed portion 414 faces the insertion direction (negative Y-direction). As described later, the first pushed portion 414 is a portion which is to be pushed by the eject bar 310. However, in the present embodiment, the release member 410 receives a force along the ejection direction (positive Y-direction) from the resilient member 430. Accordingly, the first pushed portion 414 may not be provided.

The first conversion portion 416 has a surface oblique to both the insertion direction and the lateral direction. In detail, the first conversion portion 416 has the surface that faces the negative X-direction and the negative Y-direction.

The operated portion 418 has a surface which faces the ejection direction (positive Y-direction). The second pushing portion 420 has an edge which faces the ejection direction (positive Y-direction). As best shown in FIG. 15, in the present embodiment, the operated portion 418 is located forward of the second pushing portion 420 by the thickness of the metal plate.

Figure 18:
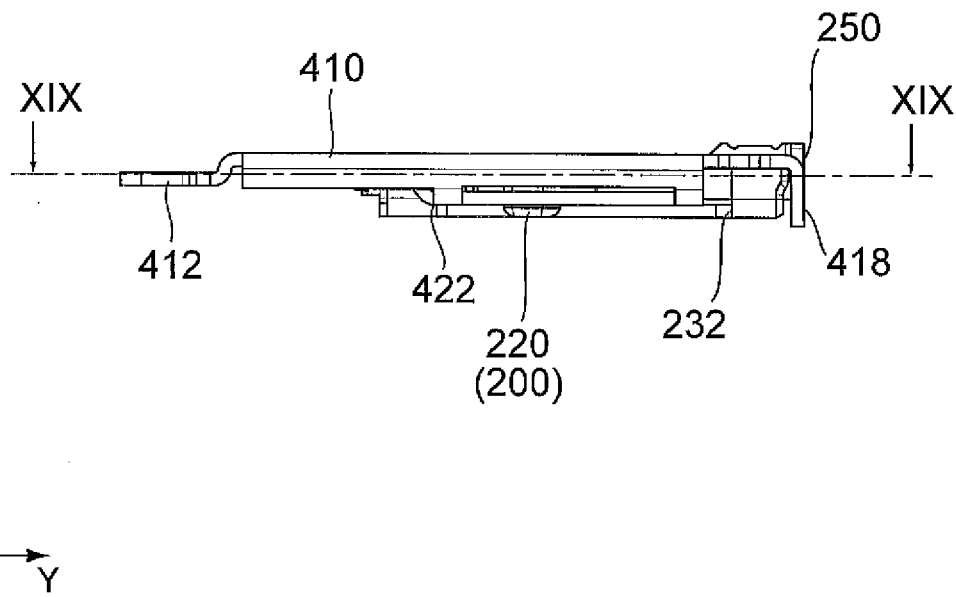
FIG. 18 is a side view showing a relation between the lock member and the release member.

As shown in FIGS. 17 and 18, the switch operator 422 is formed at a lower portion (negative Z-side) of the release member 410. The switch operator 422 has a rear end portion (negative Y-side end portion) formed with a rear surface oblique to both the insertion direction (negative Y-direction) and an up-down direction (Z-direction). In addition, the switch operator 422 is formed with a lower surface which faces downward (negative Z-direction). The lower surface of the switch operator 422 is located in front of the rear surface of the switch operator 422.

Figure 19:
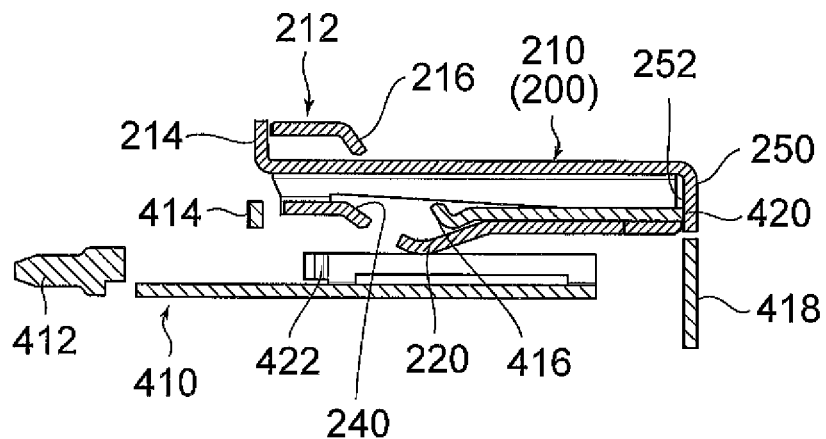
FIG. 19 is a cross-sectional view showing the relation of FIG. 18, taken along line XIX-XIX.
Figure 19:
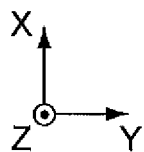
Figure 20:
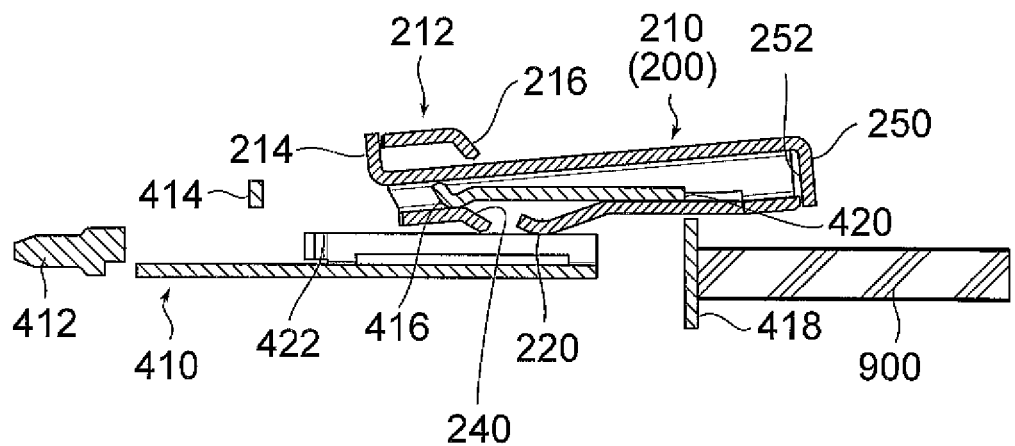
FIG. 20 is another cross-sectional view corresponding to FIG. 19, wherein the release member is operated by using a pin (operation member).
Figure 20:
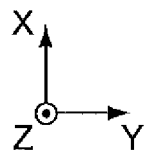

As shown in FIGS. 18 to 20, the lock member 200 and the release member 410 are combined. In detail, the first conversion portion 416 and the second pushing portion 420 of the release member 410 are located between the arm 210 and the spring portion 220 of the lock member 200 in the lateral direction. The second pushing portion 420 of the release member 410 is located rearward of the pressed portion 250 of the lock member 200. In addition, the spring portion 220 is located between the first conversion portion 416 and the switch operator 422 of the release member 410 in the lateral direction.

As can be seen from FIG. 3, the release member 410 is pushed by the resilient member 430 along the ejection direction (positive Y-direction). Accordingly, under a state shown in FIG. 19, the second pushed portion 252 of the lock member 200 is pushed along the ejection direction (positive Y-direction) by the second pushing portion 420 of the release member 410. As a result, as shown in FIGS. 1, 4 and 11 to 14, when the connector body 100 is mounted on and fixed to the circuit board 7 in the case 10, or when the connector device 20 is attached in the case 10, the pressed portion 250 of the lock member 200 held by the housing 110 is pressed against the reference portion 16 provided in the case 10. In other words, the resilient member 430 functions as the pressing member that presses the pressed portion 250 against the reference portion 16. Since the pressed portion 250 is pressed against the reference portion 16, the lock member 200 is positioned relatively to the case 10.

Under a state where the pressed portion 250 is pressed against the reference portion 16, the lock member 200 is located between the first position and the second position, both inclusive. Accordingly, the pressing member 430, which functions as the pressing member, keeps applying a force directed toward the second position indirectly to the lock member 200 via the release member 410.

As previously described, when the tray 600 accommodated in the connector body 100 is located at the lock position, the lock portion 212 locks the locked portion 620 of the tray 600. Accordingly, the relative positional relation between the lock member 200 and the tray 600 is fixed. Moreover, when the pressed portion 250 is pressed against the reference portion 16, the relative positional relation between the lock member 200 and the case 10 is fixed. Thus, the press of the pressed portion 250 against the case 10 positions the tray 600, which is located at the locked position, relatively to the case 10. In other words, the relative position of the tray 600 to the case 10 can be adjusted by pressing the lock member 200 against the case 10 so that variations in sizes of various members due to the fabrication tolerances and the erection tolerances can be absorbed.

As shown in FIG. 19, when the pressed portion 250 is pressed against the reference portion 16, the first conversion portion 416 is located between the second conversion portion 240 and the pressed portion 250 in the insertion direction. Meanwhile, the first conversion portion 416 and the second conversion portion 240 face each other in the insertion direction. Moreover, the spring portion 220 is Located inward of a side surface (more specifically, the positive X-side surface) of the switch operator 422 of the release member 410 in the lateral direction.

As shown in FIG. 20, when the operated portion 418 is operated by using a pin (operation member) 900 to be pushed along the insertion direction, the first conversion portion 416 and the second conversion portion 240 are brought into abutment with each other and push each other to convert an insertion force of the pin 900, or a pushing force in the insertion direction, into an outward force in the lateral direction, or a force in the negative X-direction. The second conversion portion 240 receives this outward force. Accordingly, the spring portion 220 is pressed against the side surface of the switch operator 422 to be resiliently deformed. When the spring portion 220 is resiliently deformed, the arm 210 is turned to open outward in the lateral direction to move the lock portion 212 outward in the lateral direction. Thus, the locked portion 620 (see FIG. 4) is unlocked from the lock portion 212. In the meantime, because of the friction between the first conversion portion 416 and the second conversion portion 240, the lock member 200 is kept being pushed by the resilient member 430 (see FIG. 3) via the release member 410 along the ejection direction. Accordingly, as shown in FIG. 2, the pressed portion 250 of the lock member 200 is kept being pressed against the reference portion 16 of the case 10.

Figure 21:
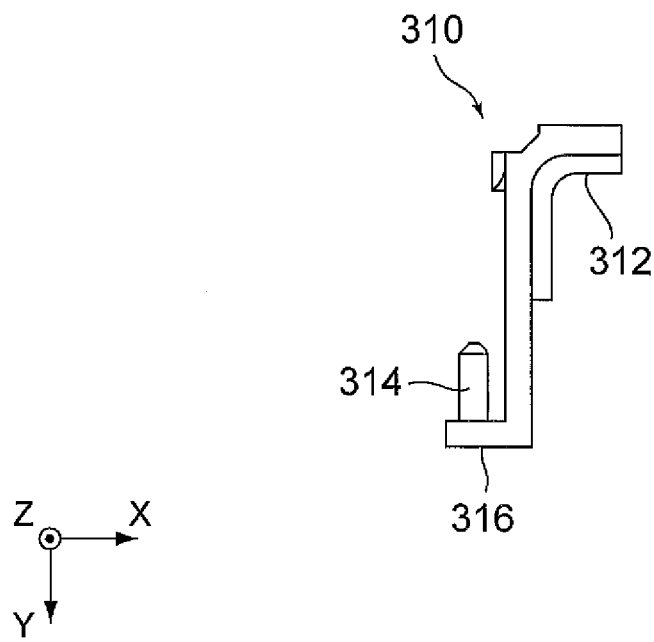
FIG. 21 is a top view showing an eject bar of the connector device of FIG. 3.

Referring to FIG. 21, the eject bar 310 has a tray receiver 312, a spring receiver 314 and a first pushing portion 316. As can be seen from FIGS. 11, 12 and 21, the tray receiver 312 protrudes into the primary accommodation portion 130. As shown in FIG. 2, the tray receiver 312 is directly brought into contact with the tray 600 when the tray 600 is accommodated in the connector body 100. In detail, the tray receiver 312 is pushed by the tray 600 along the insertion direction upon the insertion of the tray 600, while the tray receiver 312 pushes the tray 600 along the ejection direction upon the ejection of the tray 600. The spring receiver 314 is inserted in one of ends of the resilient member 320. Since the spring receiver 116 of the housing 110 is inserted in a remaining one of the ends of the resilient member 320, the resilient member 320 is sandwiched between the housing 110 and the eject bar 310. Accordingly, the eject bar 310 receives a force along the ejection direction from the resilient member 320. The eject bar 310 ejects the tray 600 by using this force. In the present embodiment, because the resilient member 320 is for ejecting the tray 600, the resilient member 320 is designed to have a pushing force stronger than that of the resilient member 430 of the unlock structure 400. In other words, according to the present embodiment, the pushing force of the resilient member 320 is strong so that the pushing force for certainly ejecting the tray 600 can be obtained. Moreover, according to the present embodiment, an operation force for the ejection operation of the tray 600 is necessary mainly for pushing the release member 410 against the resilient member 430 to move the lock portion 212. Accordingly, this operation force is affected little by the pushing force of the resilient member 320. Thus, according to the present embodiment, the pushing force for certainly ejecting the tray 600 can be obtained while the operation force for the ejection operation can be reduced. However, the present invention is not limited thereto. For example, the resilient member 320 and the resilient member 430 may have the same pushing force.

Under the accommodated state where the tray 600 is accommodated in the connector body 100, the locked portion 620 of the tray 600 is kept being pressed against the lock portion 212 of the lock member 200 since the eject bar 310 keeps pushing the tray 600 along the ejection direction. Accordingly, the tray 600 is maintained at the lock position. Under the accommodated state, the lock member 200 receives the pushing force along the ejection direction from the resilient member 320 via the eject bar 310 of the eject structure 300 and the tray 600. The pressed portion 250 is pressed against the reference portion 16 by the pushing force of the resilient member 320 as well. Thus, in the present embodiment, the eject structure 300 also functions as the pressing member to apply the pushing force along the ejection direction to the pressed portion 250 via the tray 600 to press the pressed portion 250 against the reference portion 16.

Moreover, the first pushing portion 316 faces the ejection direction to push the first pushed portion 414 of the release member 410 along the ejection direction by using the force of the resilient member 320. Accordingly, when the first pushing portion 316 and the first pushed portion 414 are in contact with each other, the release member 410 according to the present embodiment receives the force along the ejection direction not only from the resilient member 430 but also from the resilient member 320.

Figure 22:
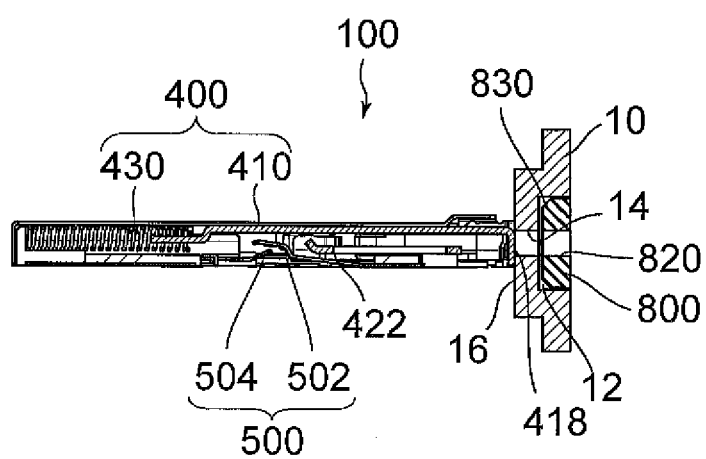
FIG. 22 is a side, cross-sectional view showing the connector device of FIG. 1, wherein a pre-warning switch in its off-state is illustrated.
Figure 22:
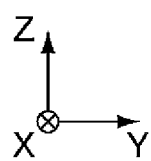
Figure 23:
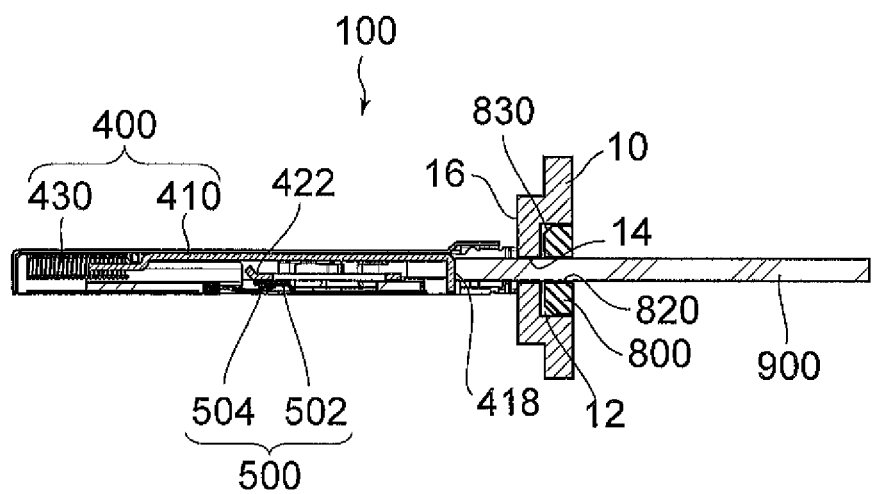
FIG. 23 is another side, cross-sectional view corresponding to FIG. 22, wherein the pre-warning switch is in its on-state.
Figure 24:
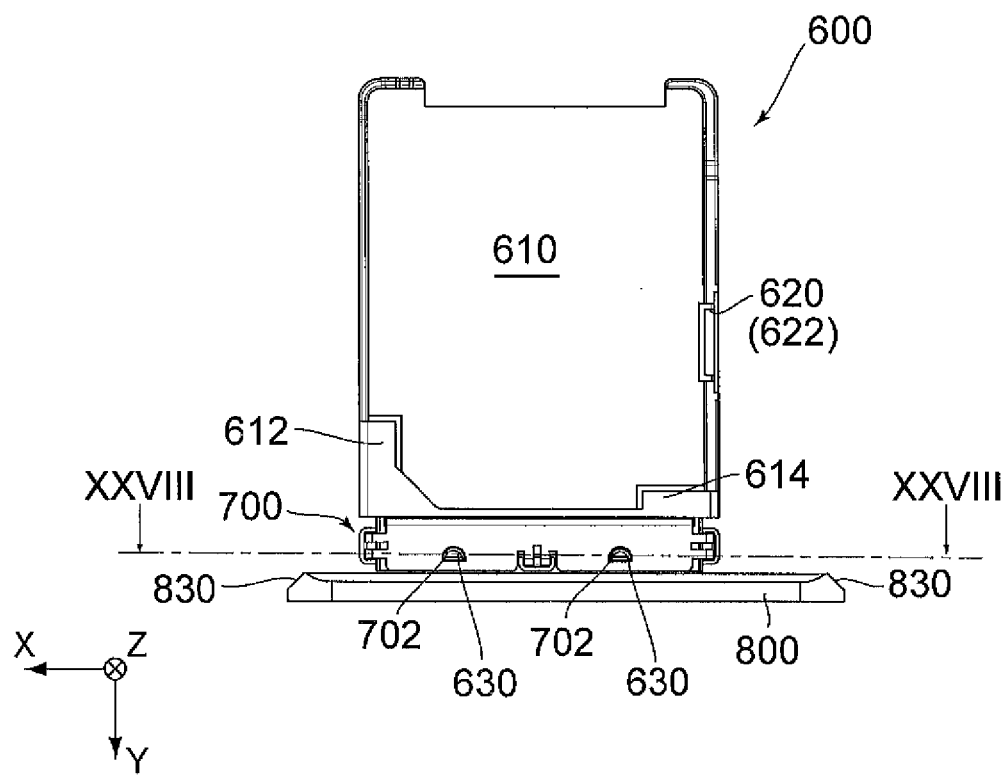
FIG. 24 is a top view showing the tray of the connector device of FIG. 1, wherein a door member is attached to the tray.

As shown in FIGS. 22 and 23, the pre-warning switch 500 according to the present embodiment is operable not by the pin (operation member) 900 itself but by the switch operator 422 of the release member 410. If the pre-warning switch 500 is directly operated by the pin 900, the switching operation might be affected due to the angle, the size and the shape of the pin 900. In contrast, according to the present embodiment, the switch operator 422 operates the pre-warning switch 500 when the operated portion 418 of the release member 410 is pushed by the pin 900. In detail, the switch operator 422 is moved in the insertion direction (negative Y-direction) to make the switch piece 502 and the switch piece 504 of the pre-warning switch 500 be brought into contact with each other in a height direction (the up-down direction, or the Z-direction). Thus, the pre-warning switch 500 according to the present embodiment is a switch for detecting that the operated portion 418 is pushed. According to the present embodiment, because the aforementioned problem is not caused, the reliability of the pre-warning switch 500 can be improved.

As shown in FIG. 1, the electronic apparatus 1 according to the present embodiment comprises the connector device 20, the case 10 and the door member 800. As shown in FIGS. 24 to 29, the door member 800 is attached to the tray 600 by using the cap 700.

The tray 600 has a card accommodation portion 610 as its main portion. In addition, the tray 600 has fall-out prevention portions 612 and 614. The fall-out prevention portions 612 and 614 are provided in the vicinity of the front end (positive Y-side end) of the card accommodation portion 610. The fall-out prevention portions 612 and 614 are portions for preventing the accommodated card 5 (see FIG. 6) from falling out. The side portion (more specifically, the negative X-side portion) of the tray 600 is formed with the locked portion 620. The locked portion 620 according to the present embodiment is recessed inward in the lateral direction (more specifically, in the positive X-direction) from the side portion of the tray 600. The locked portion 620 is formed with an edge, which functions as a second abutment portion 622, at an end thereof in the insertion direction (negative Y-direction). The second abutment portion 622 faces the ejection direction (positive Y-direction). The second abutment portion 622 is brought into abutment with the first abutment portion 214 when the lock portion 212 of the lock member 200 locks the locked portion 620. In other words, when the second abutment portion 622 is brought into abutment with the first abutment portion 214, the locked portion 620 is locked. In the present embodiment, the first abutment portion 214, which is formed of the surface perpendicular to the ejection direction, and the second abutment portion 622, which is formed of the edge perpendicular to the ejection direction, are arranged to be brought into abutment with each other in the ejection direction. Moreover, the arm 210 that has relatively high stiffness backs up the first abutment portion 214 when the first abutment portion 214 is brought into abutment with the second abutment portion 622. Accordingly, even when the electronic apparatus 1 falls down, the lock can be prevented from being unlocked by an impact. As can be seen from the above explanation, it is sufficient that each of the first abutment portion 214 and the second abutment portion 622 is formed of an edge or a surface perpendicular to the ejection direction.

The tray 600 has two support posts 630 extending in the negative Z-direction. The support posts 630 are formed in the vicinity of the front end (positive Y-side end) of the tray 600. The cap 700 is formed with two fitting holes 702. As can be seen from FIGS. 25 and 28, the support posts 630 are fit in the fitting holes 702, respectively, so that the tray 600 is formed with two receiving spaces 750. The receiving spaces 750 are located about the support posts 630, respectively.

Figure 25:
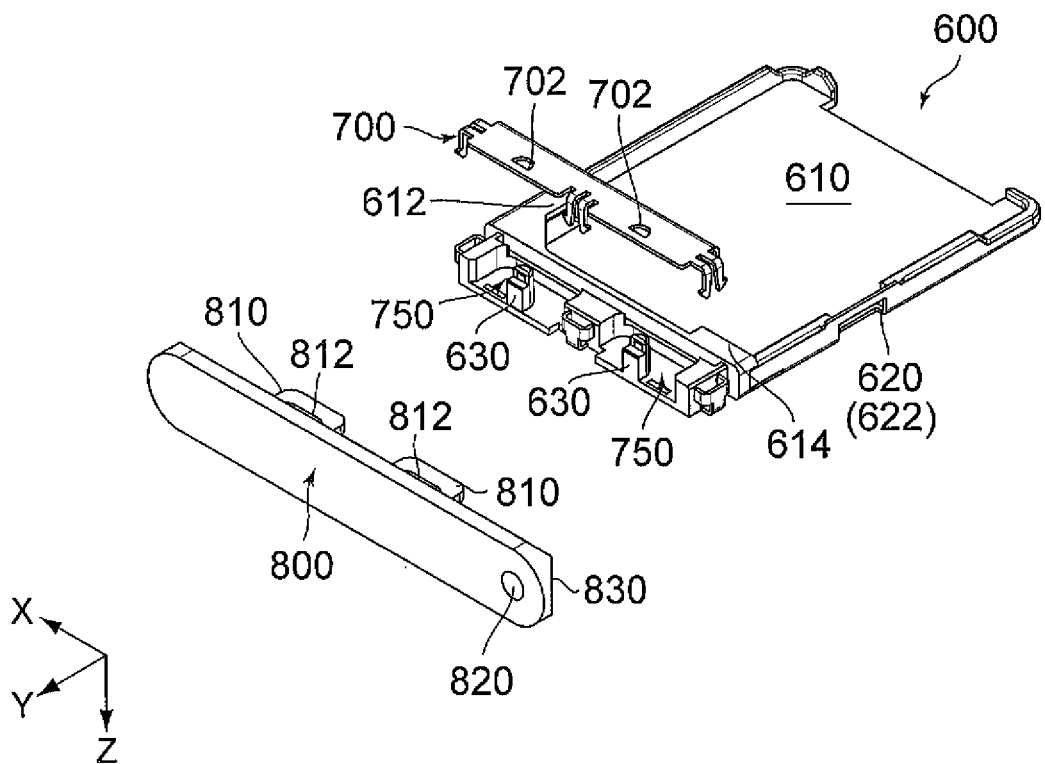
FIG. 25 is an exploded, perspective view showing the tray and the door member of FIG. 24.

As shown in FIG. 25, the door member 800 is formed with two supported portions 810, a pin insertion hole 820 and a guide portion 830. As shown in FIGS. 22 and 23, the pin insertion hole 820 is a portion for inserting the pin 900 into the connector body 100. When the door member 800 is accommodated in the door accommodation portion 12, the pin insertion hole 820, together with the hole 14 formed in the case 10, forms a path through which the pin 900 is inserted to the operated portion 418 of the release member 410 and which allows the pin 900 to be brought into abutment with the operated portion 418. As shown in FIGS. 1, 2, 22 and 23, the guide portion 830 is provided on an inner surface (negative Y-side surface) of the door member 800 in the insertion direction. In detail, the guide portion 830 is located in the vicinity of ends of the inner surface in the up-down direction and located in the vicinity of ends of the inner surface in the lateral direction. The guide portion 830 has surfaces oblique to the insertion direction. The guide portion 830 guides the door member 800 to place the door member 800 within the door accommodation portion 12 of the case 10 when the tray 600 is accommodated in the connector body 100.

Figure 29:
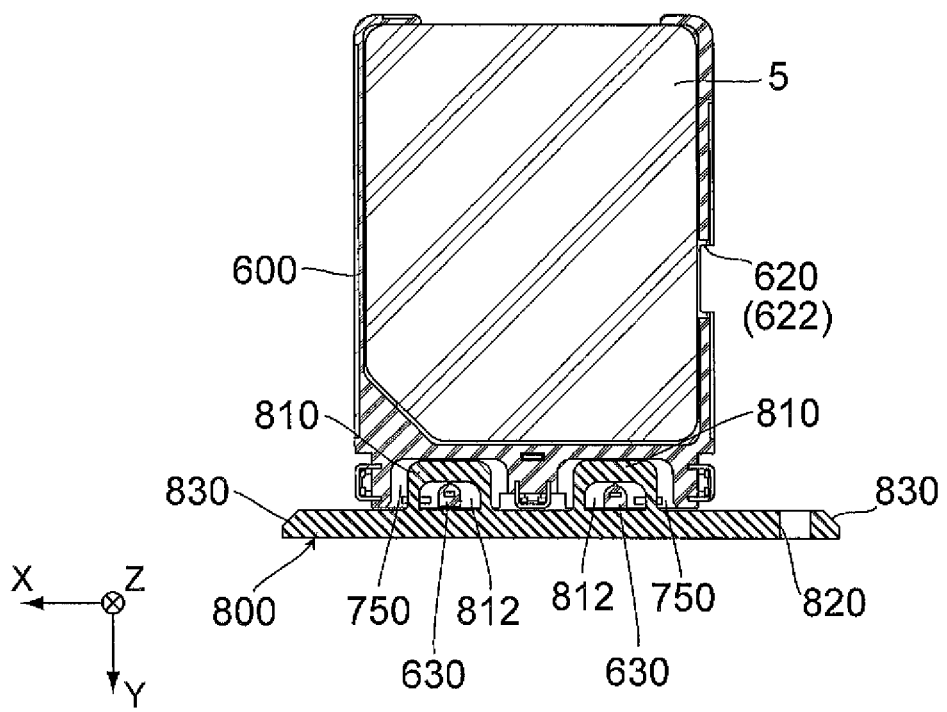
FIG. 29 is a cross-sectional view showing the tray and the door member of FIG. 27, taken along line XXIX-XXIX.

As shown in FIG. 29, each of the supported portions 810 is a plate-like portion which protrudes along the insertion direction (negative Y-direction). Each of the supported portions 810 is formed with a hole 812. The hole 812 has an area larger than that of the support post 630 in a horizontal plane (XY-plane). The support posts 630 are inserted in these holes 812, respectively, so as to be in a state where the support posts 630 are movable in the lateral direction. Moreover, the size of the receiving space 750 in the height direction (Z-direction) is sufficiently larger than the thickness (size in the Z-direction) of the supported portion 810. Accordingly, the supported portions 810 are movable in the height direction (the Z-direction, or the up-down direction) within the receiving spaces 750. Thus, the door member 800 is movable relatively to the tray 600 in a plane perpendicular to the insertion direction (negative Y-direction). However, the door member 800 is unmovable relatively to the tray 600 in the insertion direction (negative Y-direction). In other words, the door member 800 is attached to the tray 600 to be in a state where the positional relation to the tray 600 in the insertion direction is fixed. As previously described, the positional relation between the tray 600 and the case 10 can be adjusted by the press of the lock member 200 (see FIG. 30) against the case 10. Accordingly, the relative position of the door member 800 to the case 10 also can be adjusted by the press of the lock member 200 against the case 10. More specifically, according to the present embodiment, when the tray 600 is located at the lock position, the door member 800 is relatively positioned to the case 10 by the press of the pressed portion 250 against the case 10.

As can be seen from the above explanation, in the present embodiment, the variations in the relative positional relation between the case 10 and the connector body 100 attached in the case 10 are classified into two, namely, the variation in the insertion direction and the variation in the direction perpendicular to the insertion direction. The variation in the insertion direction is adjusted by positioning the lock member 200 relative to the case 10, while the variation in the direction perpendicular to the insertion direction is adjusted by the support structure of the tray 600 which supports the door member 800. As a result, according to the present embodiment, the outer surface 10S of the case 10 and the outer surface 800S of the door member 800 are located in the common plane when the tray 600 is located at the lock position. In other words, the outer surface 10S and the outer surface 800S form the common plane. The aforementioned variations may be adjusted differently. For example, when only the variation in the insertion direction is supposed to cause a problem, the door member 800 may be unmovable relative to the tray 600 in the plane perpendicular to the insertion direction.

Hereafter, referring to FIGS. 30 to 35, explanation is made about the accommodation and the ejection of the tray 600 in the electronic apparatus 1 that has the aforementioned structure.

Figure 30:
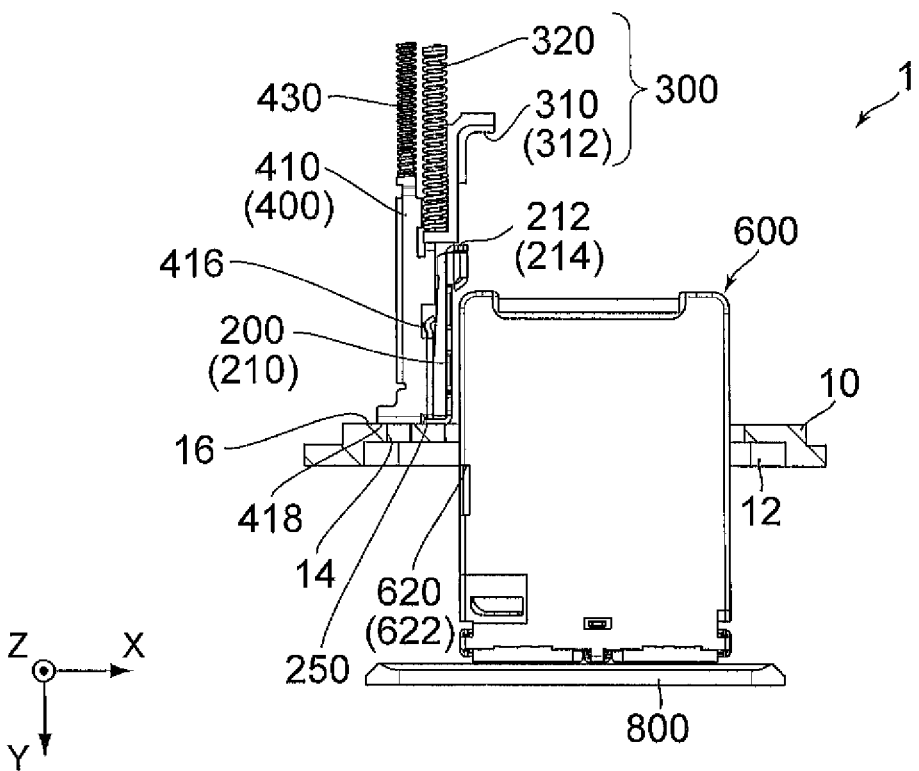
FIG. 30 is a top view showing a state of the connector device of FIG. 1, wherein the tray is not yet accommodated in the case.

As shown in FIG. 30, under a pre-accommodated state where the tray 600 does not arrive at the lock portion 212 of the lock member 200, the release member 410 is pushed along the ejection direction by the eject structure 300 and the resilient member 430. The lock member 200 is pushed along the ejection direction by this release member 410. As a result, the pressed portion 250 of the lock member 200 is pressed against the reference portion 16 of the case 10.

Figure 31:
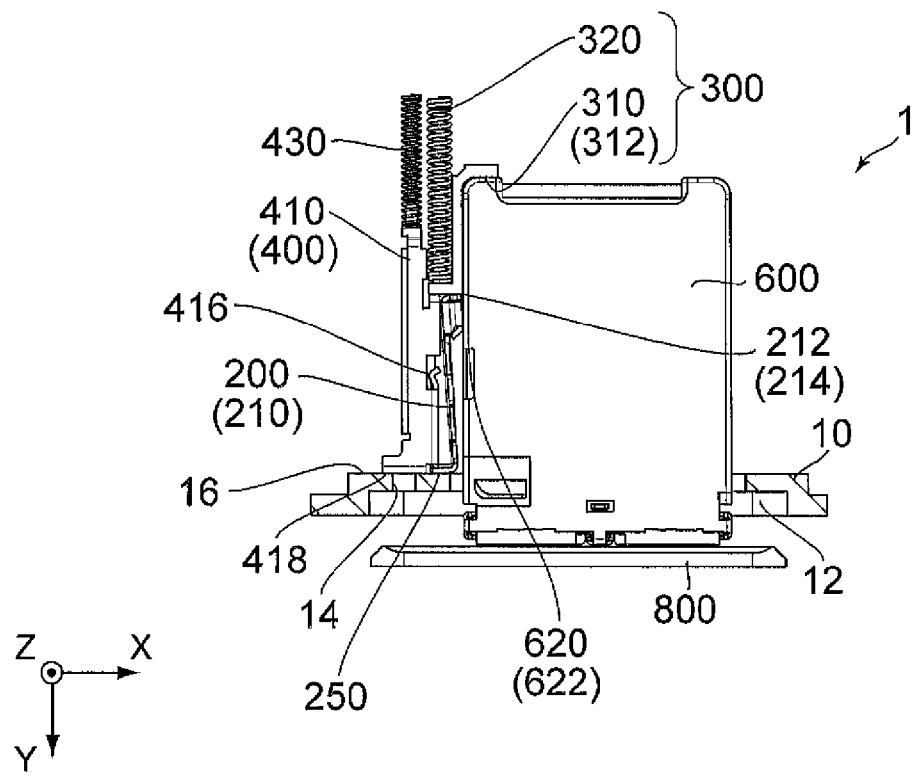
FIG. 31 is a top view showing another state of the connector device of FIG. 1, wherein the tray is partially accommodated in the case.

As shown in FIG. 31, when the insertion of the tray 600 proceeds, the lock portion 212 of the lock member 200 is pushed outward in the lateral direction (in the present embodiment, along the negative X-direction).

Figure 32:
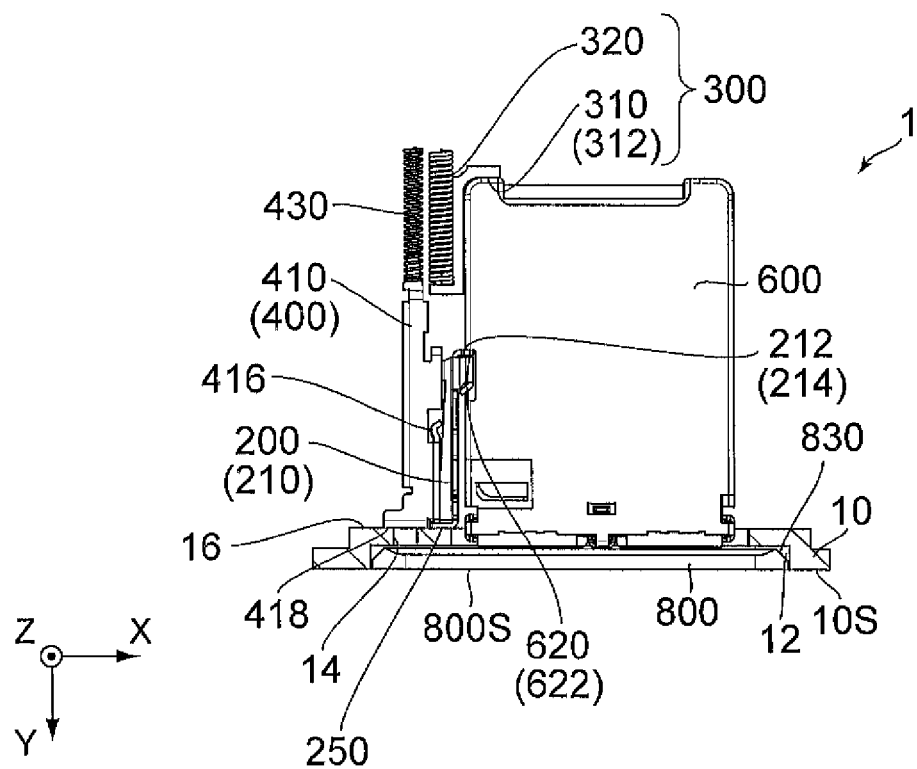
FIG. 32 is a top view showing another state of the connector device of FIG. 1, wherein the lock portion of the lock member locks the locked portion of the tray.

As shown in FIG. 32, when the insertion of the tray 600 further proceeds, the door member 800 is accommodated in the door accommodation portion 12 of the case 10. In the meantime, the eject bar 310 is pushed by the tray 600 along the insertion direction, while the tray 600 receives the force along the ejection direction from the resilient member 320. Moreover, since the lock portion 212 of the lock member 200 locks the locked portion 620 of the tray 600, the tray 600 is maintained at the lock position. In other words, the tray 600 is maintained in the accommodated state. As previously described, when the tray 600 is located at the lock position, the positional relation between the door member 800 and the case 10 is adjusted by pressing the pressed portion 250 of the lock member 200 against the reference portion 16 of the case 10. Accordingly, in the present embodiment, the outer surface 800S of the door member 800 and the outer surface 10S of the case 10 can form the common plane.

Moreover, the door member 800 according to the present embodiment is attached to the tray 600 so as to be movable in the XZ-plane. Accordingly, even if the door member 800 is out of the door accommodation portion 12 in the XZ-plane, the relative position of the door member 800 is adjusted so that the door member 800 is properly accommodated in the door accommodation portion 12. Moreover, in the present embodiment, because the door member 800 is provided with the guide portion 830, the relative positional relation between the door member 800 and the door accommodation portion 12 can be adjusted only when an operator pushes to insert the door member 800 with little consideration about the mismatch in position.

Figure 33:
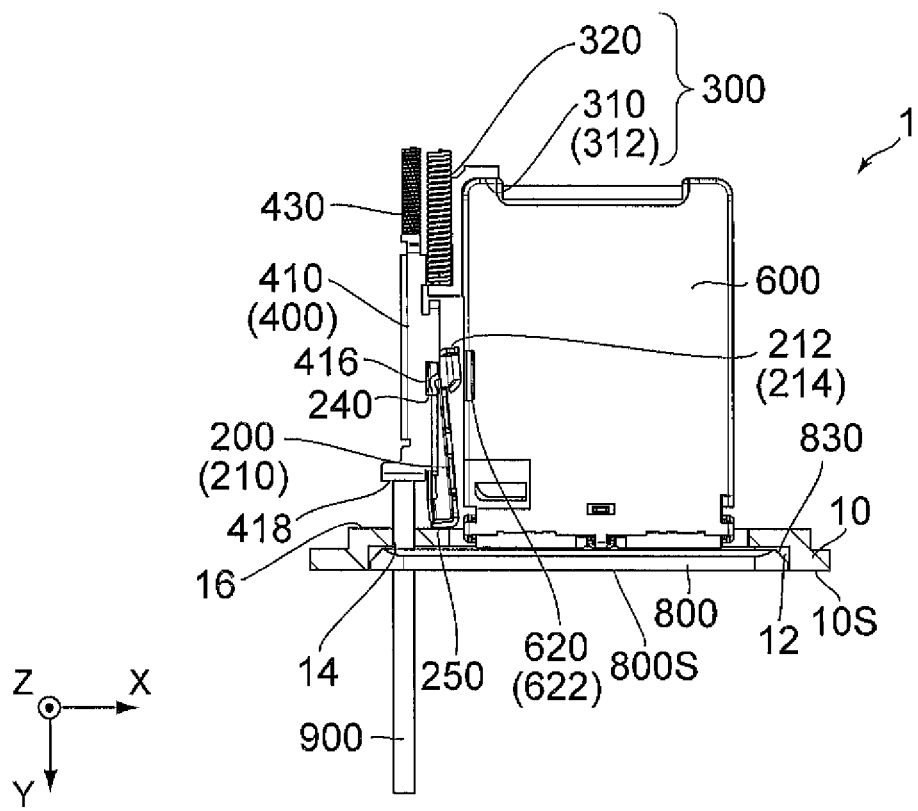
FIG. 33 is a top view showing another state of the connector device of FIG. 1, wherein the locked portion of the tray is unlocked by the operation of the operation member.

As shown in FIG. 33, when the pin 900 pushes the operated portion 418 of the release member 410 to move the release member 410 in the insertion direction, the first conversion portion 416 is brought into abutment with the second conversion portion 240. The insertion force of the pin 900 is converted into the outward force in the lateral direction (in the present embodiment, the force along the negative X-direction) to move the lock portion 212 outward in the lateral direction. As a result, the lock of the lock portion 212 to the locked portion 620 is unlocked.

Figure 34:
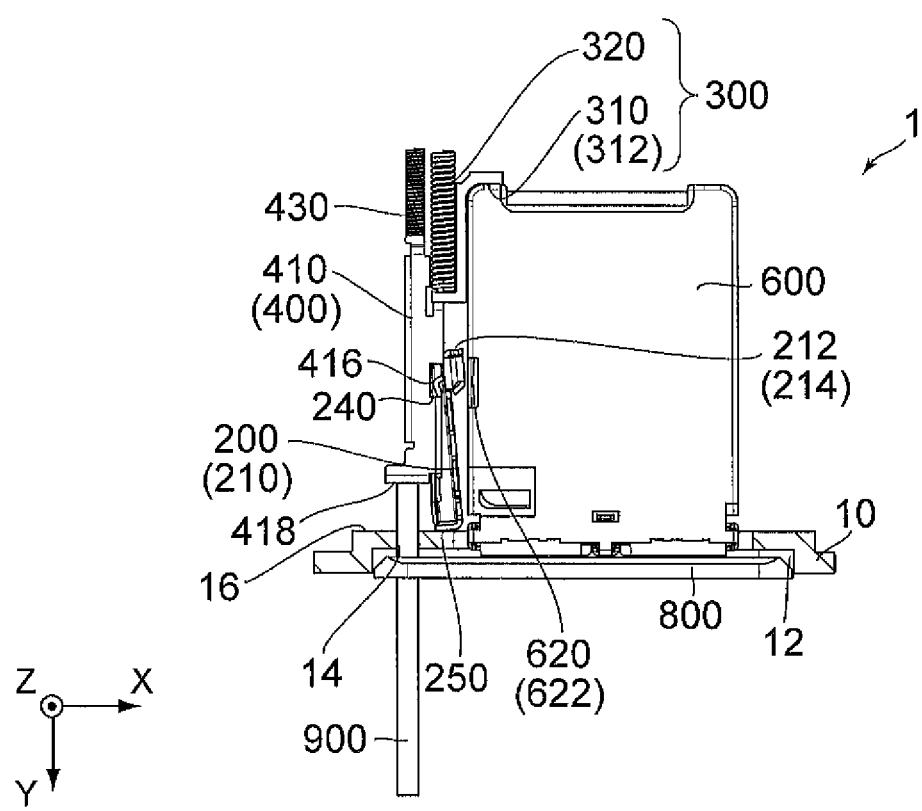
FIG. 34 is a top view showing another state of the connector device of FIG. 1, wherein the eject bar begins to be moved as a result of the unlock of the locked portion.

As shown in FIG. 34, when the lock is unlocked, the eject bar 310 begins to eject the tray 600. However, at the timing of the illustrated state, because the pin 900 pushes the release member 410 in the insertion direction, the movement along the ejection direction is temporally stopped upon the abutment of the eject bar 310 with the release member 410.

Figure 35:
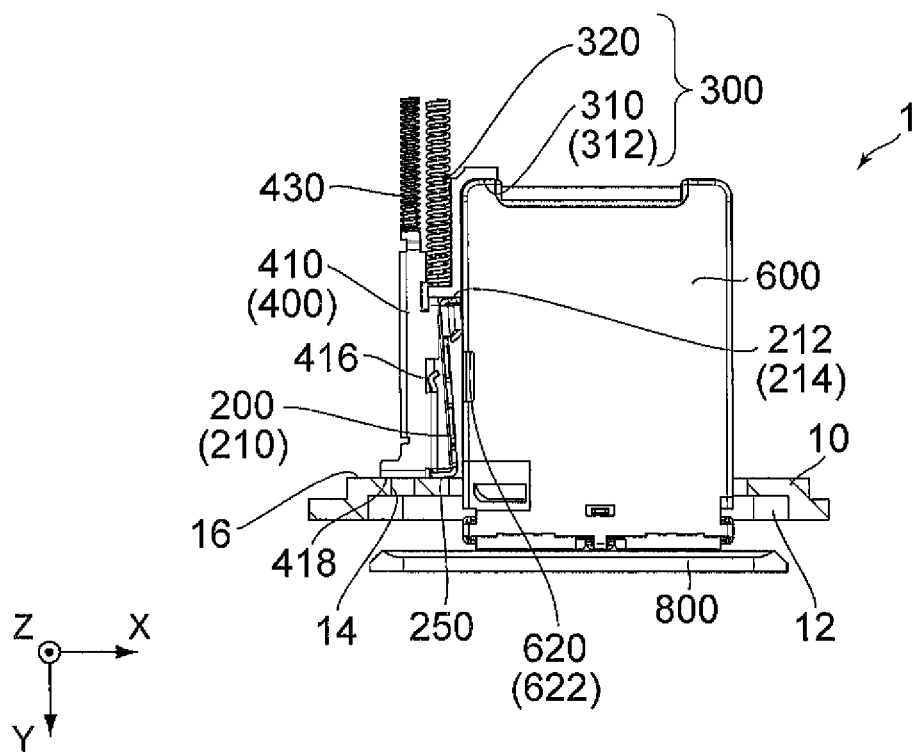
FIG. 35 is a top view showing another state of the connector device of FIG. 1, wherein the eject bar ejects the tray.

As shown in FIG. 35, either when the pin 900 is removed or when the force applied to the pin 900 is removed, the eject bar 310 further ejects the tray 600. Accordingly, the tray 600 can be taken out of the electronic apparatus 1. When the tray 600 is taken out of the electronic apparatus 1, the lock member 200, the eject structure 300 and the unlock structure 400 return to the state illustrated in FIG. 30.

In the aforementioned embodiment, both the resilient member 430 of the unlock structure 400 and the eject structure 300 are used as the pressing members. In other words, the resilient member 430 of the unlock structure 400 also functions as the pressing member in addition to the eject structure 300. However, only the eject structure 300 may be used as the pressing member without providing the resilient member 430. Moreover, the pressing member may apply the force directly to the lock member 200. For example, the resilient member 430 may apply the force directly to the lock member 200.

Hereafter, referring to FIGS. 36 to 41, explanation is made about a modification where only the eject structure 300 is used as the pressing member. The connector device according to the modification has the same structure as the connector device 20 according to the aforementioned embodiment except that the connector device according to the modification comprises a release member 410' and an unlock structure 400' without the spring receiver 412 and does not comprise the resilient member 430. Accordingly, the same members and portions are identified by the same reference numbers, and the detail explanation about these members and portions is not made.

Figure 36:
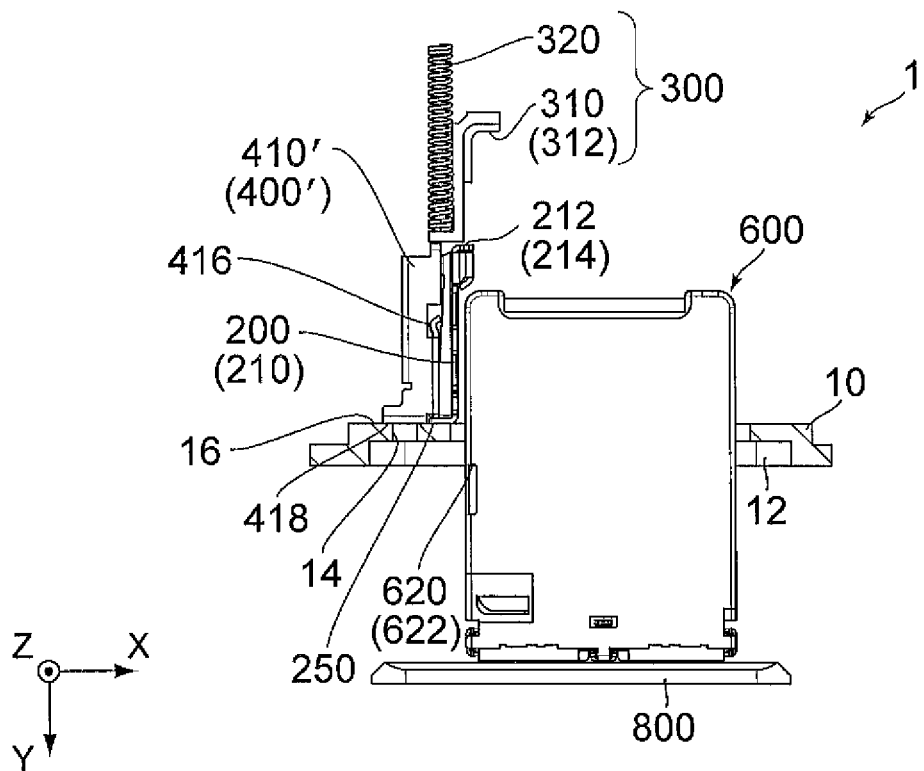
FIG. 36 is a top view showing a state of a connector device according to a modification, wherein the illustrated state corresponds to the state of FIG. 30.

As shown in FIG. 36, under the pre-accommodated state where the tray 600 does not arrive at the lock portion 212 of the lock member 200, the release member 410' is pushed along the ejection direction by the eject structure 300. The lock member 200 is pushed along the ejection direction by this release member 410'. As a result, the pressed portion 250 of the lock member 200 is pressed against the reference portion 16 of the case 10.

Figure 37:
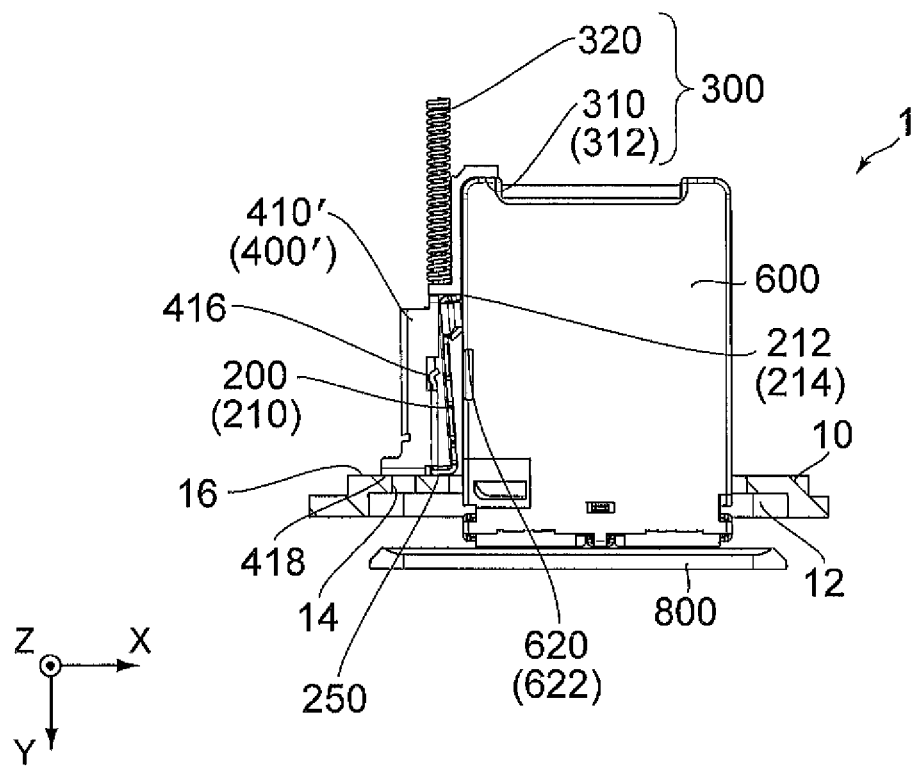
FIG. 37 is a top view showing another state of the connector device according to the modification, wherein the illustrated state corresponds to the state of FIG. 31.

As shown in FIG. 37, when the insertion of the tray 600 proceeds, the lock portion 212 of the lock member 200 is pushed outward in the lateral direction (in the present modification, along the negative X-direction).

Figure 38:
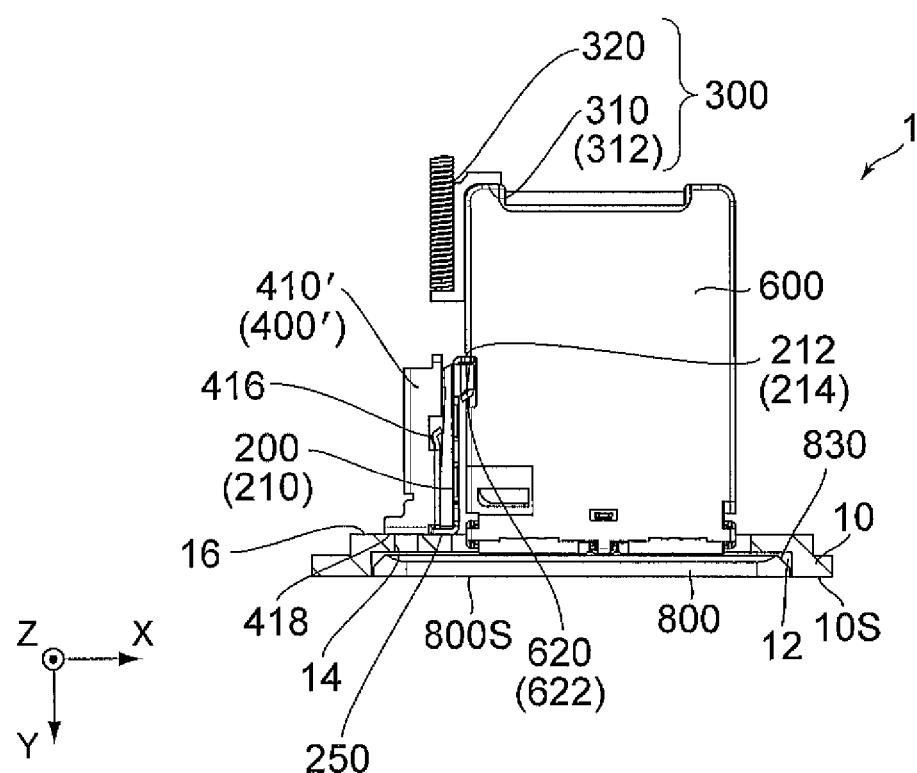
FIG. 38 is a top view showing another state of the connector device according to the modification, wherein the illustrated state corresponds to the state of FIG. 32.

As shown in FIG. 38, when the insertion of the tray 600 further proceeds, the door member 800 is accommodated in the door accommodation portion 12 of the case 10. In the meantime, the eject bar 310 is pushed by the tray 600 along the insertion direction, while the tray 600 receives the force along the ejection direction from the resilient member 320. Moreover, since the lock portion 212 of the lock member 200 locks the locked portion 620 of the tray 600, the tray 600 is maintained at the lock position. As previously described, when the tray 600 is located at the lock position, the positional relation between the door member 800 and the case 10 is adjusted by pressing the pressed portion 250 of the lock member 200 against the reference portion 16 of the case 10. Accordingly, in the present modification, the outer surface 800S of the door member 800 and the outer surface 10S of the case 10 can form the common plane.

In the aforementioned embodiment, between the state illustrated in FIG. 31 and the state illustrated in FIG. 32, the release member 410 is continuously kept being pushed along the ejection direction by the resilient member 430. In contrast, in the present modification, the resilient member 430 is not provided. In other words, the release member 410' and the lock member 200 are not pushed along the ejection direction between the state illustrated in FIG. 37 and the state illustrated in FIG. 38. Accordingly, it is necessary to prevent the lock member 200 from being pulled by the tray 600 to be moved in the insertion direction. For example, it is necessary that the friction force between the release member 410' and the lock member 200 and the friction force between the release member 410' and the housing 110 are designed to be large. Because such a consideration is not necessary in the aforementioned embodiment, it can be said that the aforementioned embodiment has higher reliability than the present modification in a point of obtaining the desirable action.

Figure 39:
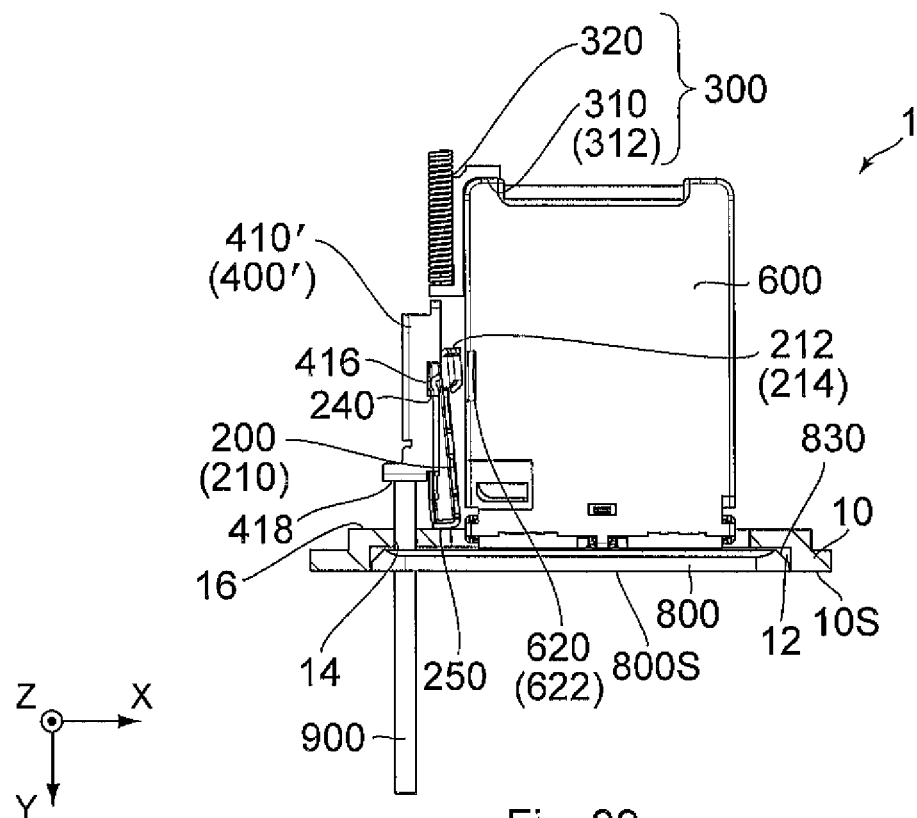
FIG. 39 is a top view showing another state of the connector device according to the modification, wherein the illustrated state corresponds to the state of FIG. 33.

As shown in FIG. 39, when the pin 900 pushes the operated portion 418 of the release member 410' to move the release member 410' in the insertion direction, the first conversion portion 416 is brought into abutment with the second conversion portion 240. The insertion force of the pin 900 is converted into the outward force in the lateral direction (in the present modification, the force along the negative X-direction) to move the lock portion 212 outward in the lateral direction. As a result, the lock of the lock portion 212 to the locked portion 620 is unlocked.

Figure 40:
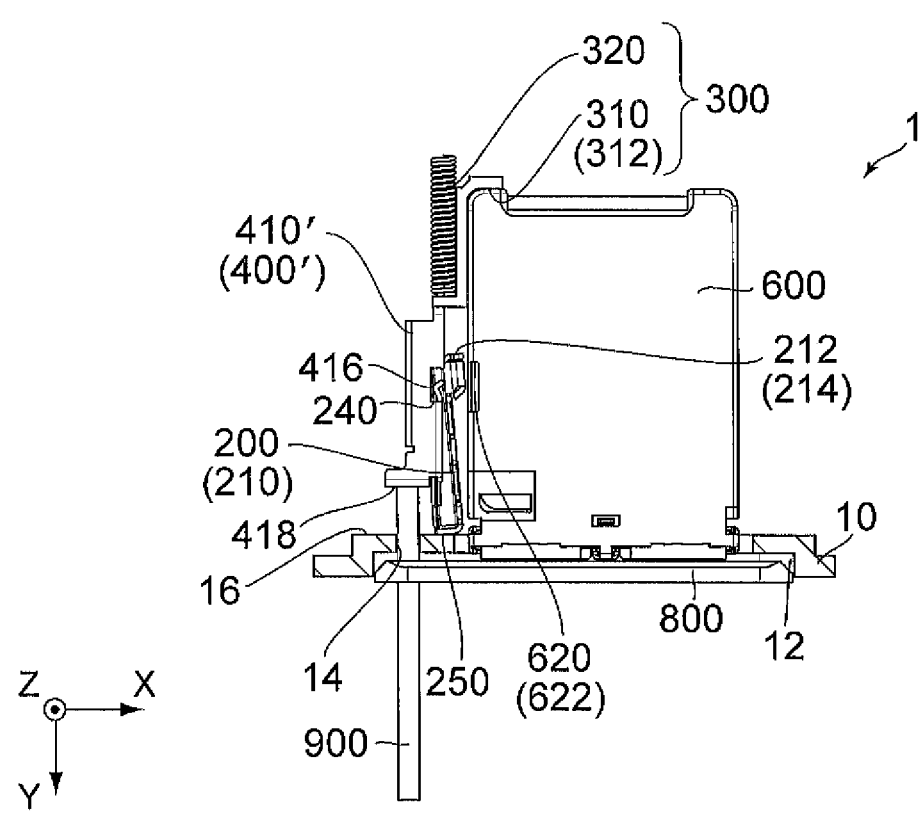
FIG. 40 is a top view showing another state of the connector device according to the modification, wherein the illustrated state corresponds to the state of FIG. 34.

As shown in FIG. 40, when the lock is unlocked, the eject bar 310 begins to eject the tray 600. However, at the timing of the illustrated state, because the pin 900 pushes the release member 410' in the insertion direction, the movement along the ejection direction is temporally stopped upon the abutment of the eject bar 310 with the release member 410'.

Figure 41:
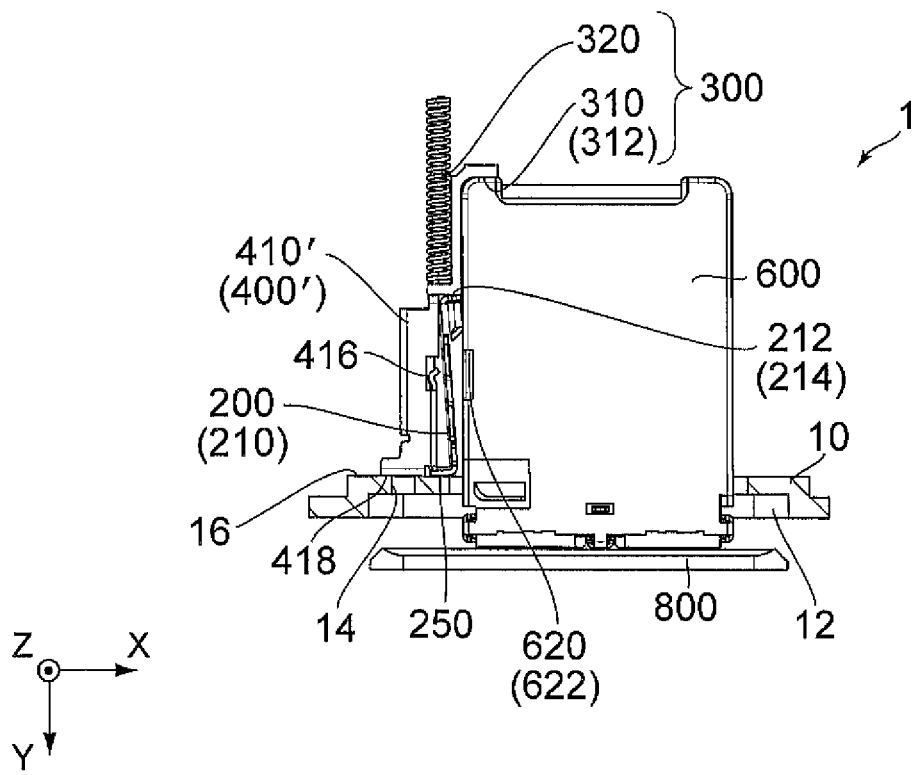
FIG. 41 is a top view showing another state of the connector device according to the modification, wherein the illustrated state corresponds to the state of FIG. 35.
Figure 42:
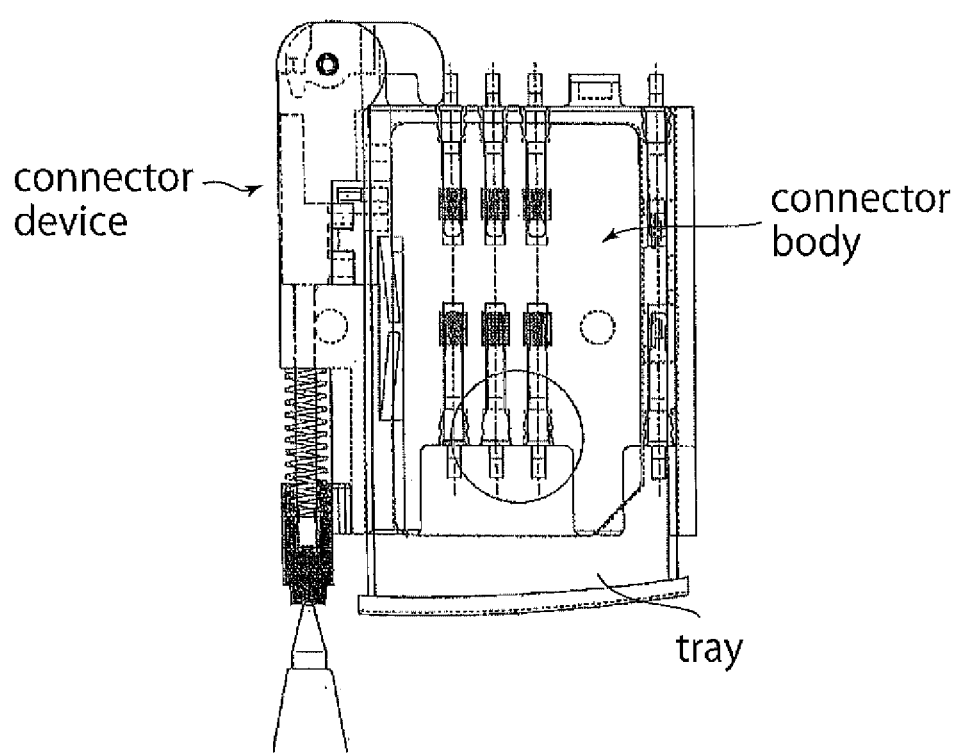
FIG. 42 is a view showing a connector device of Patent Document 1.
Figure 43:
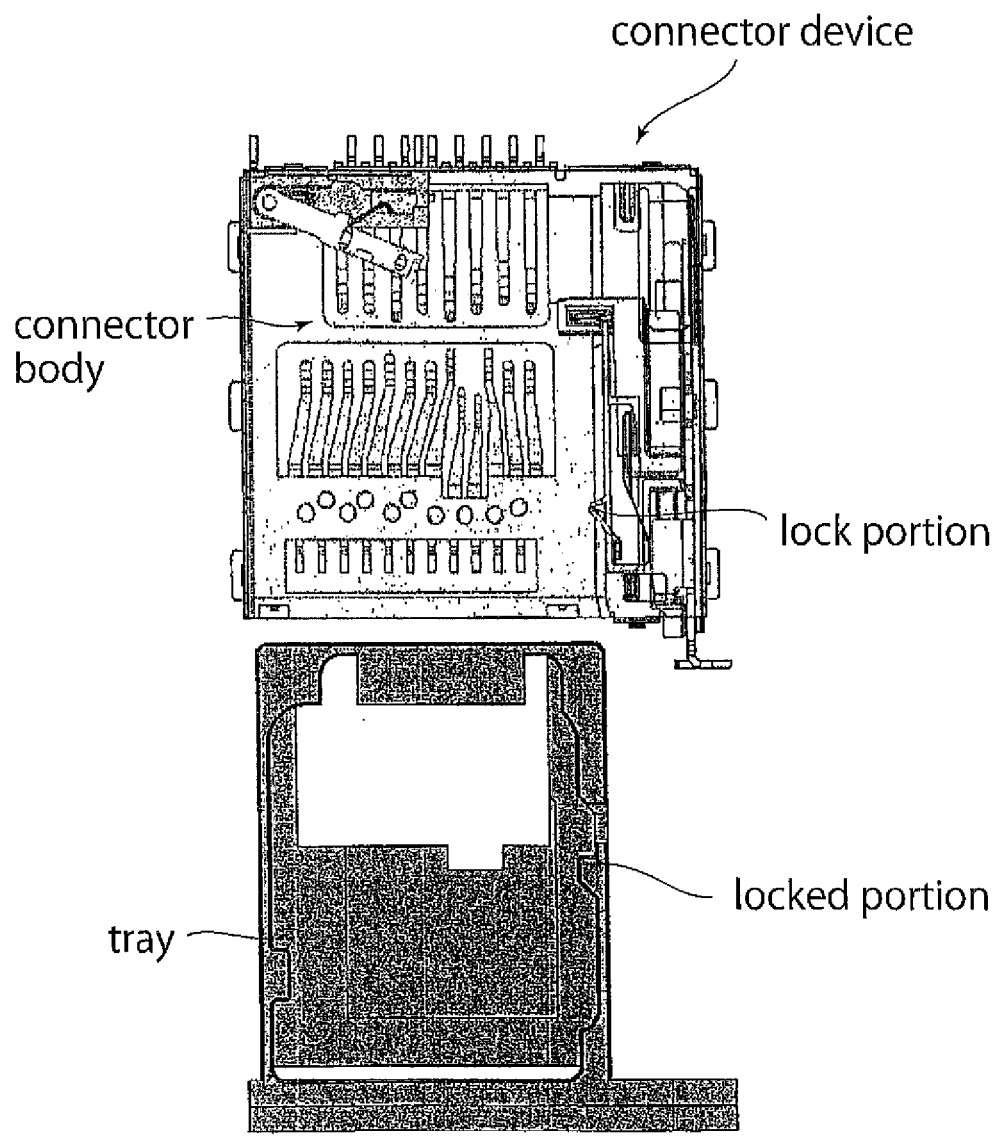
FIG. 43 is a view showing a connector device of Patent Document 2.

As shown in FIG. 41, either when the pin 900 is removed or when the force applied to the pin 900 is removed, the eject bar 310 further ejects the tray 600. Accordingly, the tray 600 can be taken out of the electronic apparatus 1. When the tray 600 is taken out of the electronic apparatus 1, the lock member 200, the eject structure 300 and the unlock structure 400' return to the state illustrated in FIG. 36.

The present application is based on a Japanese patent application of JP2013-119232 filed before the Japan Patent Office on Jun. 5, 2013, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector device which is attached in a case of an electronic apparatus when the connector device is used, the connector device comprising:
a tray formed with a locked portion;
a connector body having an electrical connection function, the connector body being accommodatable the tray which is inserted, at least in part, into the connector body along an insertion direction;
a lock member held by the connector body, the lock member being movable between a first position and a second position along the insertion direction, the lock member being unmovable beyond the first position along the insertion direction and unmovable beyond the second position along an ejection direction opposite to the insertion direction, the lock member being provided with a lock portion and a pressed portion, the lock portion being movable in a lateral direction perpendicular to the insertion direction, the lock portion locking the locked portion to prevent the tray from moving beyond a lock position along the ejection direction when the tray is accommodated in the connector body;
an unlock structure which moves the lock portion in the lateral direction to unlock the locked portion from the lock portion when operated; and
a pressing member applying a force toward the second position directly or indirectly to the lock member, the pressing member pressing the pressed portion against the case when the connector device is attached in the case, a press of the pressed portion against the case positioning the tray, which is located at the locked position, relatively to the case.

2. The connector device as recited in claim 1, wherein:
the connector device further comprises an eject structure;
the eject structure pushes the tray accommodated in the connector device along the ejection direction; and
when the lock portion locks the locked portion, the eject structure functions as the pressing member to apply a force along the ejection direction to the pressed portion of the lock member via the tray.

3. The connector device as recited in claim 2, wherein:
the unlock structure includes a release member and a resilient member;
the release member is provided with a first conversion portion and an operated portion;
the resilient member pushes the release member to apply a force along the ejection direction to the release member;
the lock member is provided with a second conversion portion; and
when the operated portion of the release member is pushed along the insertion direction, the first conversion portion and the second conversion portion are brought into abutment with each other and pushes each other to convert a pushing force in the insertion direction into a force in the lateral direction to unlock the locked portion from the lock portion.

4. The connector device as recited in claim 3, wherein the resilient member of the unlock structure also functions as the pressing member in addition to the eject structure to push the lock member via the release member to apply a force along the ejection direction to the pressed portion.

5. The connector device as recited in claim 3, wherein the eject structure includes another resilient member whose pushing force is stronger than that of the resilient member of the unlock structure.

6. The connector device as recited in claim 1, wherein:
the unlock structure includes an release member and a resilient member;
the release member is provided with a first conversion portion and an operated portion;
the resilient member pushes the release member to apply a force along the ejection direction to the release member;
the lock member is provided with a second conversion portion;
the resilient member functions as the pressing member to push the lock member via the release member to apply a force along the ejection direction to the pressed portion; and
when the operated portion of the release member is pushed along the insertion direction, the first conversion portion and the second conversion portion are brought into abutment with each other and pushes each other to convert a pushing force in the insertion direction into a force in the lateral direction to unlock the locked portion from the lock portion.

7. The connector device as recited in claim 3, wherein:
the connector device further comprises a pre-warning switch for detecting that the operated portion is pushed;
the release member has a switch operator; and
the switch operator operates the pre-warning switch when the operated portion of the release member is pushed.

8. The connector device as recited in claim 1, wherein:
the lock portion has a first abutment portion formed of an edge or a surface perpendicular to the ejection direction;
the locked portion has a second abutment portion formed of an edge or a surface perpendicular to the ejection direction; and
when the second abutment portion is brought into abutment with the first abutment portion, the locked portion is locked.

9. The connector device as recited in claim 1, wherein:
the lock member has an arm, a spring portion and a coupling portion;
the arm extends along the insertion direction;
the spring portion faces the arm in the lateral direction;
the coupling portion couples the arm and the spring portion with each other;
the lock portion is supported by the arm; and
when the spring portion is resiliently deformed, the arm is turned to move the lock portion.

10. An electronic apparatus comprising the connector device as recited in claim 1, a case and a door member, wherein:
the connector body is fixed in the case;
the door member is attached to the tray in a state where a positional relation to the tray in the insertion direction is fixed;
the pressed portion is pressed against an inside portion of the case; and
when the tray is located at the lock position, the door member is positioned relatively to the case by a press of the pressed portion against the case.

11. The electronic apparatus as recited in claim 10, wherein an outer surface of the case and an outer surface of the door member are located in a common plane when the tray is located at the lock position.

12. The electronic apparatus as recited in claim 10, wherein the door member is movable in a plane perpendicular to the insertion direction.

* * * * *